(12) United States Patent
Takano

(10) Patent No.: US 7,100,173 B2
(45) Date of Patent: Aug. 29, 2006

(54) LIBRARY APPARATUS INCLUDING VERTICAL RAIL FIXED TO REMAIN STATIONARY WITH RESPECT TO A COVER MEMBER

(75) Inventor: Akira Takano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 177 days.

(21) Appl. No.: 10/376,126

(22) Filed: Feb. 28, 2003

(65) Prior Publication Data

US 2004/0042354 A1    Mar. 4, 2004

(30) Foreign Application Priority Data

Aug. 30, 2002    (JP)    ............... 2002-253480

(51) Int. Cl.
*G11B 17/03*    (2006.01)
(52) U.S. Cl. .................. 720/600; 369/30.39
(58) Field of Classification Search ............ 720/600; 369/30.45, 30.49, 30.39
See application file for complete search history.

(56) References Cited

U.S. PATENT DOCUMENTS

| 4,815,055 | A | * | 3/1989 | Fago, Jr. ................ 369/30.43 |
| 4,937,690 | A | * | 6/1990 | Yamashita et al. ............ 360/92 |
| 5,101,387 | A | * | 3/1992 | Wanger et al. ........... 369/30.45 |
| 5,377,121 | A | | 12/1994 | Dimitri et al. .............. 364/478 |
| 5,513,156 | A | | 4/1996 | Hanaoka et al. ............. 369/34 |
| 5,546,366 | A | * | 8/1996 | Dang ...................... 369/30.39 |
| 5,717,665 | A | * | 2/1998 | Jones ..................... 369/30.41 |
| 6,034,927 | A | * | 3/2000 | Pollard ................... 369/30.45 |
| 6,166,877 | A | * | 12/2000 | Tadokoro et al. ............ 360/92 |
| 6,449,223 | B1 | | 9/2002 | Kanetsuku et al. ...... 369/30.41 |

FOREIGN PATENT DOCUMENTS

| JP | 5-242656 | 9/1993 |
| JP | 7-44334 | 2/1995 |
| JP | 9-167412 | 6/1997 |
| JP | 10-011868 | 1/1998 |
| JP | 11-96628 | 4/1999 |
| JP | 2002-25167 | 1/2002 |

* cited by examiner

*Primary Examiner*—David Davis
(74) *Attorney, Agent, or Firm*—Greer, Burns & Crain, Ltd.

(57) ABSTRACT

In a library apparatus, a vertical rail is fixed on a cover member so that a storage medium input-output machine disposed inside the library apparatus moves in a vertical direction, and a horizontal rail moves along the vertical rail in the vertical direction so that the storage medium input-output machine moves in a horizontal direction. Thus, storage media can move between storage medium storing shelves and a drive. The horizontal rail is provided with a mounting section.

10 Claims, 21 Drawing Sheets

LIBRARY APPARATUS INCLUDING VERTICAL RAIL FIXED TO REMAIN STATIONARY WITH RESPECT TO A COVER MEMBER

BACKGROUND OF THE INVENTION

1. Field of the Invention

The present invention relates to a library apparatus for storing a plurality of storage media such as magnetic tapes and magneto-optical disks to perform at least information reproduction for those storage media.

2. Description of the Related Art

Hitherto, there is known a library apparatus in which a plurality of storage media such as magnetic tapes and magneto-optical disks is stored, and upon receipt of an instruction from an operator and another apparatus, a desired storage medium is mounted on a drive to record information onto the storage medium and to perform information reproduction for the storage medium. The library apparatus is a so-called back-up apparatus for saving information, providing against an emergency, in such a manner that for example, in a computer network, the library apparatus is connected to a host computer taking a leading part in a plurality of computer systems, the same information as that stored in the host computer is kept.

FIG. 17 is a perspective view of the conventional library apparatus, looking from the front.

A library apparatus 800 shown in FIG. 17 comprises a cover member 810 and a moving mechanism 820 having a horizontal rail 821 fixed on a bottom plate 810a inside the cover member 810 in a horizontal direction.

FIG. 18 is a perspective view of the moving mechanism shown in FIG. 17.

The moving mechanism 820 shown in FIG. 18 comprises: the horizontal rail 821 shown also in FIG. 17; a horizontal direction moving base 822 travelling along the horizontal rail 821 in a horizontal direction; a moving base driving motor 823 fixed on the horizontal direction moving base 822 for moving the horizontal direction moving base 822 in a horizontal direction; a vertical rail 824 fixed on the horizontal direction moving base 822 travelling together with the horizontal direction moving base 822 in a horizontal direction; a storage medium exchanging mechanism 825 travelling along the vertical rail 824 for deriving a desired storage medium from among the stored storage media (not illustrated) to mount the derived storage medium on a drive (not illustrated); and a storage medium exchanging mechanism driving motor 826 fixed on the horizontal direction moving base 822 for moving the storage medium exchanging mechanism 825 in a vertical direction.

Recently as computers have come into wide use, a large amount of information is dealt with routinely, and an amount of information stored in a computer system expands. Thus, there is increased a demand of a library apparatus capable of increasing the maximum storage capacity of the library apparatus serving as a back-up for information.

Hitherto, it is performed that the maximum storage capacity of a library apparatus is increased in such a manner that a plurality of library apparatuses is coupled to one another, and the coupled library apparatuses in its entirety (hereinafter, the coupled library apparatuses in its entirety are referred to as an expanded library apparatus) are regarded as one library apparatus and be used (cf. Japanese Patent Publication TokuKai. 1999-96628).

As types of the expanded library apparatus, there are known types, which will be explained hereinafter.

FIG. 19 is an explanatory view useful for understanding a first type of extended library apparatus of the conventional extended library apparatuses.

The first type of extended library apparatus shown in FIG. 19 is a library apparatus having the same structure as the library apparatus proposed in the referenced above Japanese Patent Publication TokuKai. 1999-96628. The first type of extended library apparatus is equivalent to one in which the library apparatus 800 having the same moving mechanism 820 as the moving mechanism 820 shown in FIG. 17 and FIG. 18 is combined with an extended library apparatus 800'. The horizontal rail 821 provided on the moving mechanism 820 is fixed on a bottom plate inside the cover member 810 in a horizontal direction. Inside the cover member 810, there are provided storage medium storage shelves 151 for storing therein a plurality of storage media 31. The extended library apparatus 800' is provided with a horizontal rail 821' fixed on a bottom plate inside a cover member 810' of the extended library apparatus 800' in a horizontal direction and storage medium storage shelves 151 for storing therein a plurality of storage media 31.

FIG. 20 is a flowchart useful for understanding a flow in which storage media are carried in the first type of extended library apparatus shown in FIG. 19.

First, there is derived a storage medium 31 stored in a storage medium storage shelf 151 provided in the cover member 810' of the extending library apparatus 800' (step S31).

Next, the storage medium 31 derived in the step S31 is carried in the cover member 810' of the extended library apparatus 800' and the cover member 810 of the library apparatus 800 (step S32).

Lastly, the storage medium 31 carried in the step S32 is inserted into a recording and reproduction apparatus (not illustrated) provided in the cover member 810 of the library apparatus 800 (step S33).

However, according to the first type of extended library apparatus shown in FIG. 19, when a plurality of library apparatuses is coupled to one another, there is a need to couple horizontal rails to one another, which are fixed on the bottom plates inside the cover members of the plurality of library apparatuses in the horizontal direction, respectively. As mentioned above, the storage medium exchanging mechanism travels along the vertical rail in the vertical direction together with the vertical rail travelling together with the horizontal direction moving base 822 in the horizontal direction. Thus, occurrence of a difference in level on the coupling portion of the horizontal rail makes it difficult that the storage medium exchanging mechanism smoothly travels, and in some case it would be impossible that the storage medium exchanging mechanism travels. Therefore, in some case of conditions of a set up surface for such a type of extended library apparatus, it is difficult to couple a plurality of library apparatuses to one another in such a manner that the coupling portion of the horizontal rail is coupled free from a difference in level, and it will require a great deal of time and labor to establish the extended library apparatus.

FIG. 21 is an explanatory view useful for understanding a second type of extended library apparatus of the conventional extended library apparatuses.

The second type of extended library apparatus shown in FIG. 21 is one in which two library apparatuses each having the same moving mechanism 820 as the moving mechanism 820 shown in FIG. 17 and FIG. 18 are coupled with each other. The horizontal rail 821 provided on the moving mechanism 820 is fixed on a bottom plate inside the cover member 810 of the library apparatus 800 in a horizontal direction. Inside the cover member 810, there are provided storage medium storage shelves 151 for storing therein a plurality of storage media 31. A coupling portion of the cover members 810 of two library apparatuses 800 is provided with a storage medium delivery mechanism 900 in which charging and discharging slot (not illustrated) for inputting or discharging storage media 31 is provided directed toward the inside direction of the cover member 810.

FIG. 22 is a flowchart useful for understanding a flow in which storage media are carried in the second type of extended library apparatus shown in FIG. 21.

In the explanation of the flowchart shown in FIG. 22, of two library apparatuses 800 shown in FIG. 21, the cover member 810 of a right side of library apparatus 800 is referred to as an R side cover member, and the cover member 810 of a left side of library apparatus 800 is referred to as an L side cover member.

First there is derived a storage medium 31 stored in a storage medium storage shelf 151 provided in the R side cover member (step S41).

Next, the storage medium 31 derived in the step S41 is conveyed in the R side cover member (step S42).

Next, the storage medium 31 conveyed in the step S42 is inserted from the charging and discharging slot into the storage medium delivery mechanism 900 (step S43).

Next, in the storage medium delivery mechanism 900 into which the storage medium 31 inserted in the step S43, the inserted storage medium 31 is transferred to the L side cover member side (step S44).

Next, the storage medium 31, which is transferred to the L side cover member side in the step S44, is delivered from the charging and discharging slot of the storage medium delivery mechanism 900 to the L side cover member side (step S45).

Next, the storage medium 31, which is delivered in the step S45, is conveyed in the L side cover member (step S46).

Lastly, the storage medium 31, which is conveyed in the step S46, is inserted into a recording and reproduction apparatus (not illustrated) provided in the L side cover member (step S47).

According to the second type of extended library apparatus show in FIG. 21, as in the first type of extended library apparatus show in FIG. 19, there is no need to couple the rails to one another, and thus it is easy in establishment. However, in the event that the storage medium is mounted through the storage medium delivery mechanism on the drive, a time (hereinafter, this time is referred to as a conveyance time) from deriving the storage medium from the storage shelf up to mounting it on the drive requires a time on the order of two times to three times as much as the conveyance time in the first type of extended library apparatus show in FIG. 19. This involves a problem that efficiency in conveyance per hour becomes worse.

Further, according to the second type of extended library apparatus show in FIG. 21, there are provided the same number of moving mechanisms as the number of coupled library apparatuses. Thus, as compared with the first type of extended library apparatus show in FIG. 19, which is capable of coping with coupling of a plurality of library apparatuses with one moving mechanism, it involves problems of high cost and increment of dissipation power.

SUMMARY OF THE INVENTION

In view of the foregoing, it is an object of the present invention to provide a library apparatus having a mechanism capable of coupling a plurality of library apparatuses making no sacrifice of moving time of the storage medium.

To achieve the above-mentioned object, the present invention provides a first library apparatus comprising: storage medium storing shelves storing a plurality of storage media; a drive performing at least information reproduction for the storage medium; a moving mechanism moving the storage media between the storage medium storing shelves and the drive; and a cover member inside which the storage medium storing shelves, the drive and the moving mechanism are disposed, wherein said moving mechanism comprises:

a vertical rail fixed on said cover member in a vertical direction;

a horizontal rail extending in a horizontal direction with respect to said vertical rail, said horizontal rail moving along said vertical rail in a vertical direction;

a storage medium input-output machine moving on said horizontal rail in the vertical direction to perform an operation for input-output of the storage media to the storage medium storing shelves and the drive; and a mounting section mounting an extending member for extending said horizontal rail.

In the first library apparatus, the vertical rail is fixed on the cover member so that the storage medium input-output machine disposed inside the library apparatus moves in the vertical direction, and the horizontal rail moves along the vertical rail in the vertical direction so that the storage medium input-output machine moves in the horizontal direction. Thus, the storage media can move between the storage medium storing shelves and the drive. The horizontal rail is provided with the mounting section. Thus, according to the first library apparatus, when a plurality of horizontal rails is coupled with one another to join the cover members of a plurality of library apparatuses, coupling of the horizontal rails taking the same planes of the horizontal rails as a standard makes it possible to couple the horizontal rails with one another free from differences in level. Further, according to the first library apparatus, the horizontal rail is not fixed on the cover member. Thus, when the cover members of a plurality of library apparatuses are coupled to one another, even if those cover members are set up in a state that there occur differences in level on the cover members owing to conditions of a set up surface for a plurality of library apparatuses, it has no effect of differences in level between the cover members on connection between the horizontal rails. Accordingly, it is possible to readily couple a plurality of library apparatuses with one another. Furthermore, according to the first library apparatus of the present invention, in connection of a plurality of horizontal rails when the cover members of a plurality of library apparatuses are coupled with one another, there is no need of the storage medium delivery mechanism provided on the second type of extended library apparatus explained referring to FIG. 21 and FIG. 22, and thus it is possible to couple the horizontal rails with one another making no sacrifice of moving time of the storage medium.

To achieve the above-mentioned object, the present invention provides a second library apparatus comprising: storage medium storing shelves storing a plurality of storage media; a drive performing at least information reproduction for the storage medium; a moving mechanism moving the storage media between the storage medium storing shelves and the drive; and an extended cover member inside which the storage medium storing shelves, the drive and the moving mechanism are disposed, wherein a plurality of cover members is coupled with one another, wherein said moving mechanism comprises:

a vertical rail fixed on one of the plurality of cover members in a vertical direction;

a horizontal rail extending along the plurality of cover members in a horizontal direction with respect to said vertical rail, said horizontal rail moving along said vertical rail in a vertical direction;

a storage medium input-output machine moving on said horizontal rail in the vertical direction to perform an operation for input-output of the storage media to the storage medium storing shelves and the drive.

The second library apparatus relates a library apparatus having such an arrangement in which a vertical rail moving in the vertical direction a storage medium input-output machine disposed inside the library apparatus wherein a plurality of cover members is coupled with one another taking as a standard the library apparatus having the same structure as the first library apparatus as mentioned above, is fixed onto one of a plurality of cover members, and the horizontal rail moving the storage medium input-output machine in the horizontal direction is traveled along the vertical rail in the vertical direction, so that a recording medium travels between the storage medium storage shelves and the drive. Thus, even if those cover members are set up in a state that there occur differences in level on the cover members owing to conditions of a set up surface for a plurality of library apparatuses, it has no effect of differences in level between the cover members on connection between the horizontal rails. Accordingly, it is possible to readily couple a plurality of library apparatuses with one another. Furthermore, according to the second library apparatus of the present invention, there is no need of the storage medium delivery mechanism provided on the second type of extended library apparatus explained referring to FIG. 21 and FIG. 22, and thus it is possible to implement a library apparatus free from making no sacrifice of moving time of the storage medium.

In the second library apparatus according to the present invention as mentioned above, it is acceptable that said horizontal rail is one in which a plurality of rail members associated with the plurality of cover members is coupled with one another. Alternatively, it is acceptable that said horizontal rail consists of a united body of member.

Since the horizontal rail formed in united body has no joint, the moving base loaded with the horizontal rotary mechanism and the medium holding mechanism can travel more smoothly on the horizontal rail in the horizontal direction as compared with travelling on the jointed horizontal rail in the horizontal direction.

In the second library apparatus according to the present invention as mentioned above, it is preferable that the second library apparatus further comprises a positioning mechanism measuring a position of said storage medium input-output machine to the storage medium storing shelves and the drive to adjust the position of said storage medium input-output machine.

According to the second library apparatus having such a positioning mechanism, even if those cover members are set up in a state that there occur differences in level on the cover members owing to conditions of a set up surface for a plurality of library apparatuses, execution of positioning by the positioning mechanism after all the cover members are set up makes it possible to adjust the relative position between the magnetic tape cartridge storage shelves and the drive, and the storage medium input-output machine with great accuracy.

Further, in the first library apparatus or the second library apparatus according to the present invention as mentioned above, it is preferable that said vertical rail is fixed at a position being one-sided in the cover member.

According to the library apparatus provided with the vertical rail fixed at a position being one-sided in the cover member, it is possible to dispose more storage medium storing shelves in a space wherein the vertical rail is not fixed, inside the cover member.

DETAILED DESCRIPTION OF PREFERRED EMBODIMENTS

Embodiments of the present invention will be described with reference to the accompanying drawings.

Figure 1:
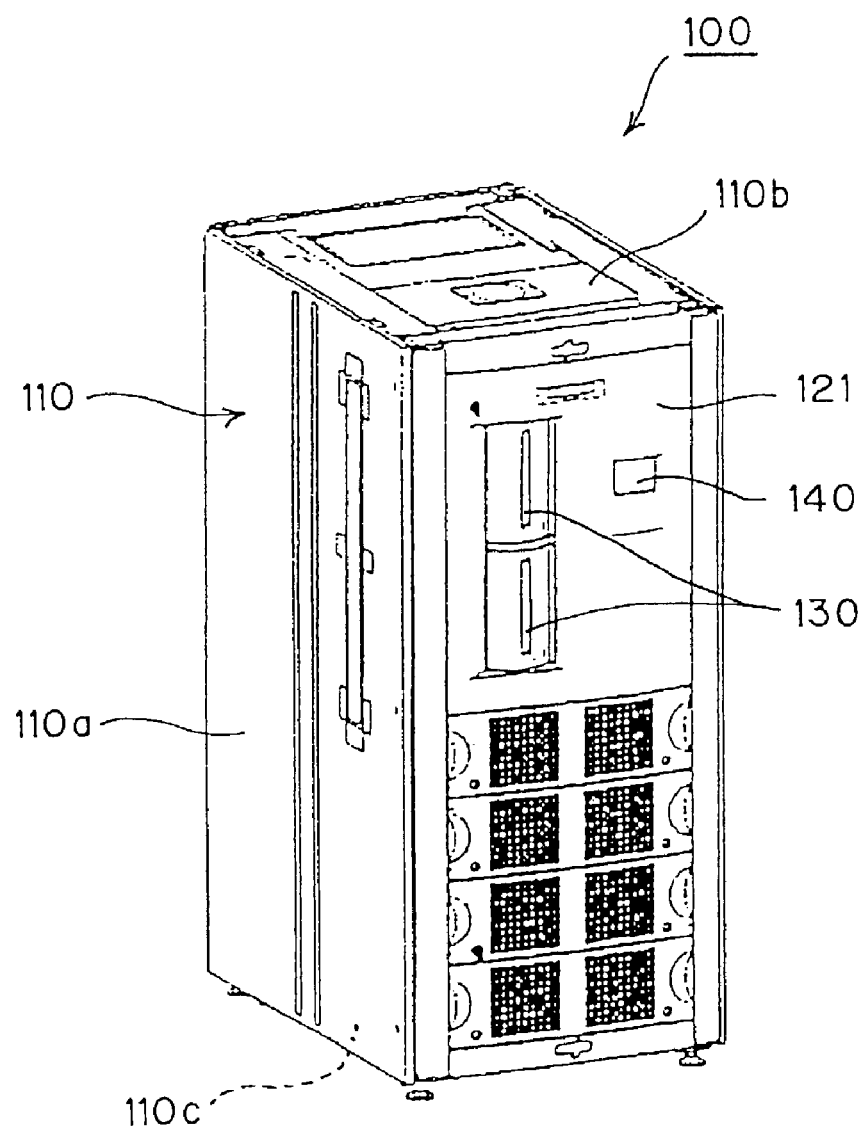
FIG. 1 is a perspective view of a library apparatus according to an embodiment of the present invention, looking from the front.
Figure 2:
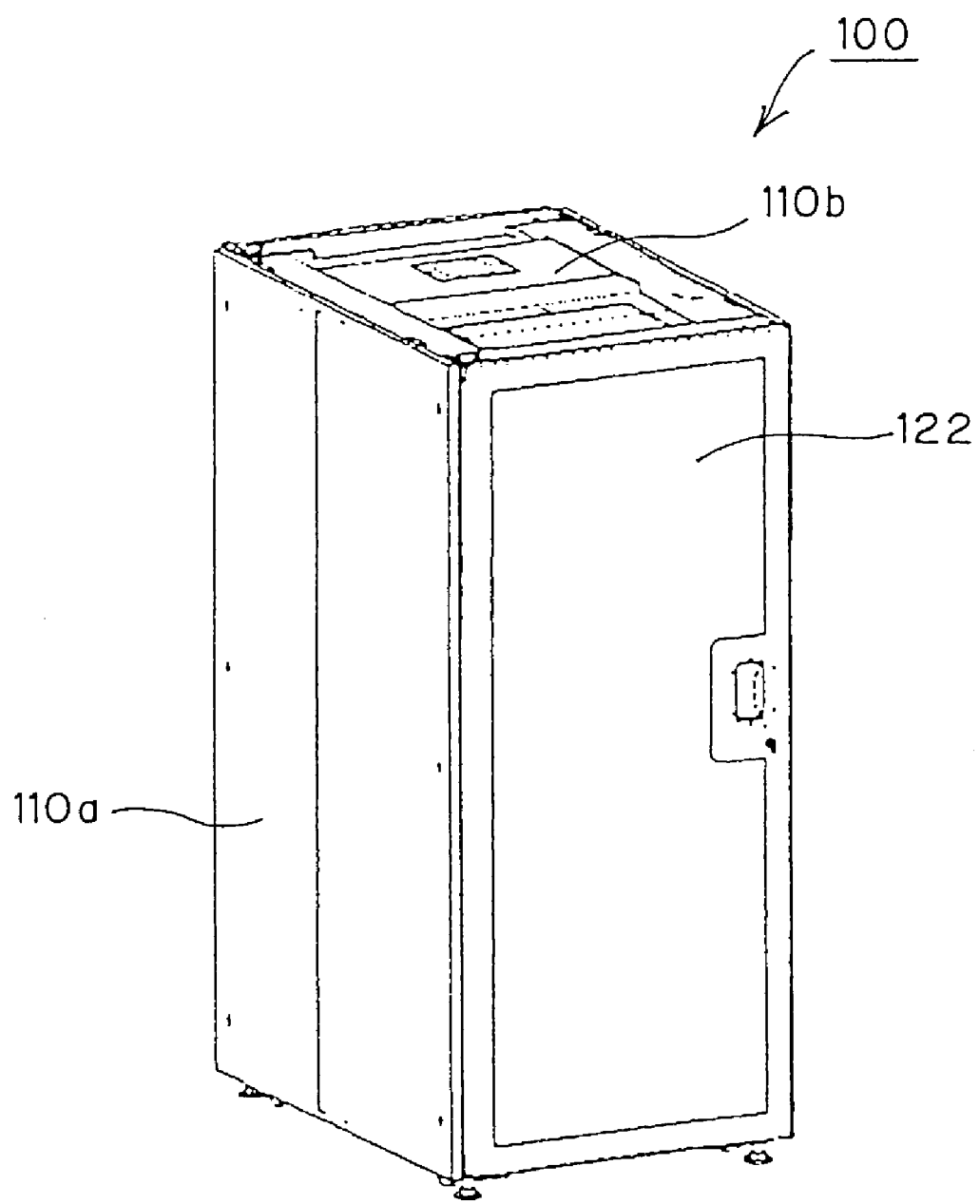
FIG. 2 is a perspective view of the library apparatus shown in FIG. 1, looking from the back.

FIG. 1 is a perspective view of a library apparatus according to an embodiment of the present invention, looking from the front. FIG. 2 is a perspective view of the library apparatus shown in FIG. 1, looking from the back.

A library apparatus 100 shown in FIG. 1 and FIG. 2 is a magnetic tape in which a desired magnetic tape is mounted on a tape drive to record information onto the magnetic tape or reproduce information recorded on the magnetic tape.

The library apparatus 100 comprises: a cover member 110 constituted of a side panel 110a, a top plate 110b, a bottom plate 110c, and a pole 110d (which will be described later); a front door 121 positioned in front of the cover member 110; and a back door 122 positioned in back of the cover member 110. On the front door 121, there are provided charging and discharging slots 130 incorporating thereinto a charging and discharging mechanism for charging and discharging a magnetic tape cartridge storing a magnetic tape, and an operator panel 140 in which various types of switches to be operated by an operator are arranged.

Figure 3:
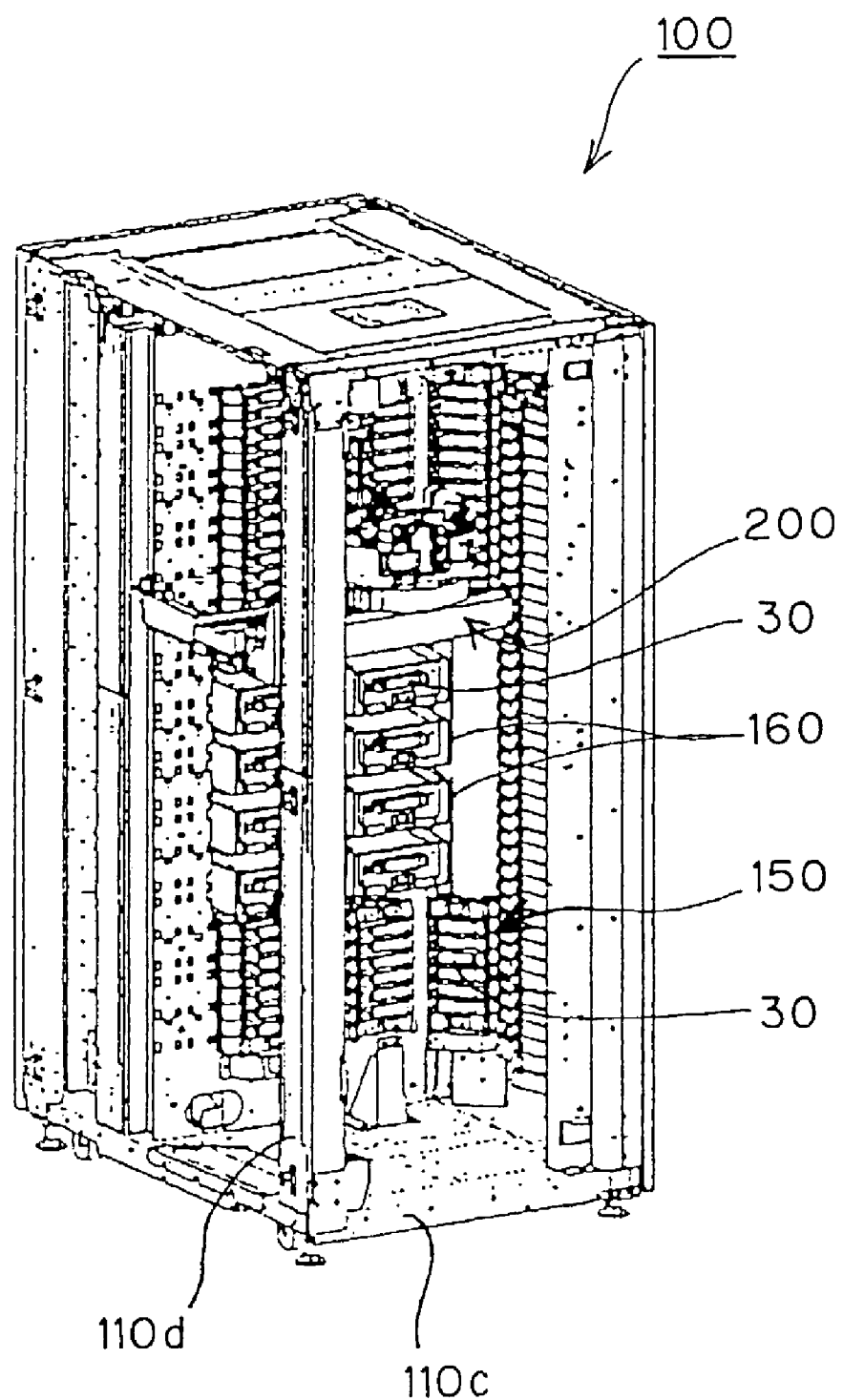
FIG. 3 is an explanatory view useful for understanding the library apparatus shown in FIG. 1, removing a front door of a cover member of the library apparatus and a side panel of the library apparatus, looking from the front.
Figure 4:
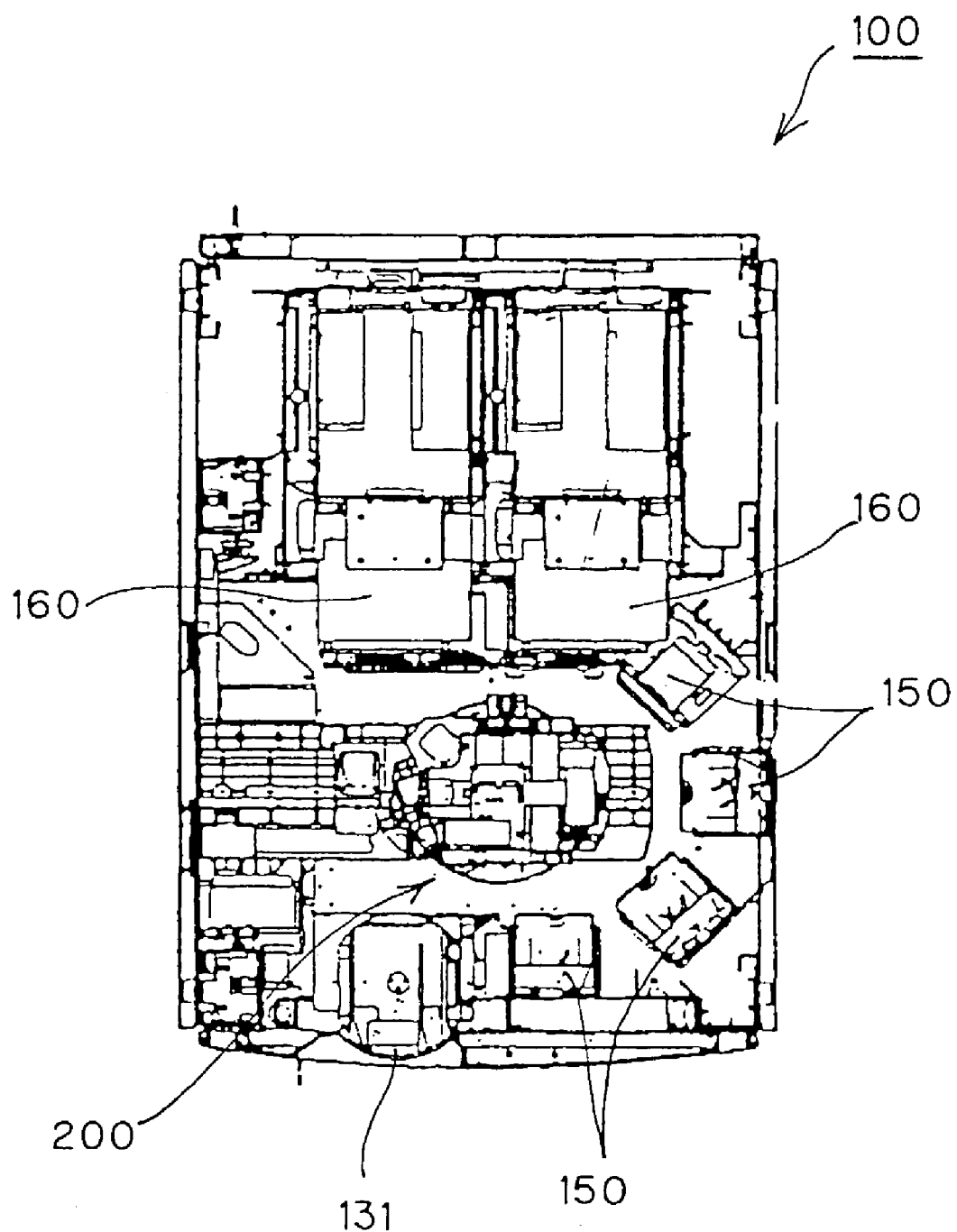
FIG. 4 is an explanatory view useful for understanding the library apparatus shown in FIG. 1, removing a top plate of the library apparatus, looking from the top.

FIG. 3 is an explanatory view useful for understanding the library apparatus shown in FIG. 1, removing a front door of a cover member of the library apparatus and a side panel of the library apparatus, looking from the front. FIG. 4 is an explanatory view useful for understanding the library apparatus shown in FIG. 1, removing a top plate of the library apparatus, looking from the top.

The library apparatus 100 shown in FIG. 3 and FIG. 4 has the pole 110d that is one of the structural elements of the cover member 110. Inside the cover member 110, there are provided a charging and discharging mechanism 131 for charging and discharging a magnetic tape cartridge 30 through the charging and discharging slot 130 shown in FIG. 1, magnetic tape cartridge storage shelves 150 for storing a plurality of magnetic tape cartridges 30, recording and reproduction apparatuses 160 for performing recording of information onto the magnetic tape cartridges 30 and reproduction of information recorded on the magnetic tape cartridges 30, and a moving mechanism 200 for moving the magnetic tape cartridges 30 between the charging and discharging mechanism 131 and the magnetic tape cartridge storage shelves 150 and the recording and reproduction apparatuses 160.

The magnetic tape cartridge storage shelves 150 are one example of the storage medium-storing shelf referred to in the present invention. The recording-and reproduction apparatuses 160 are one example of the drive referred to in the present invention. The moving mechanism 200 is one example of the moving mechanism referred to in the present invention.

Figure 5:
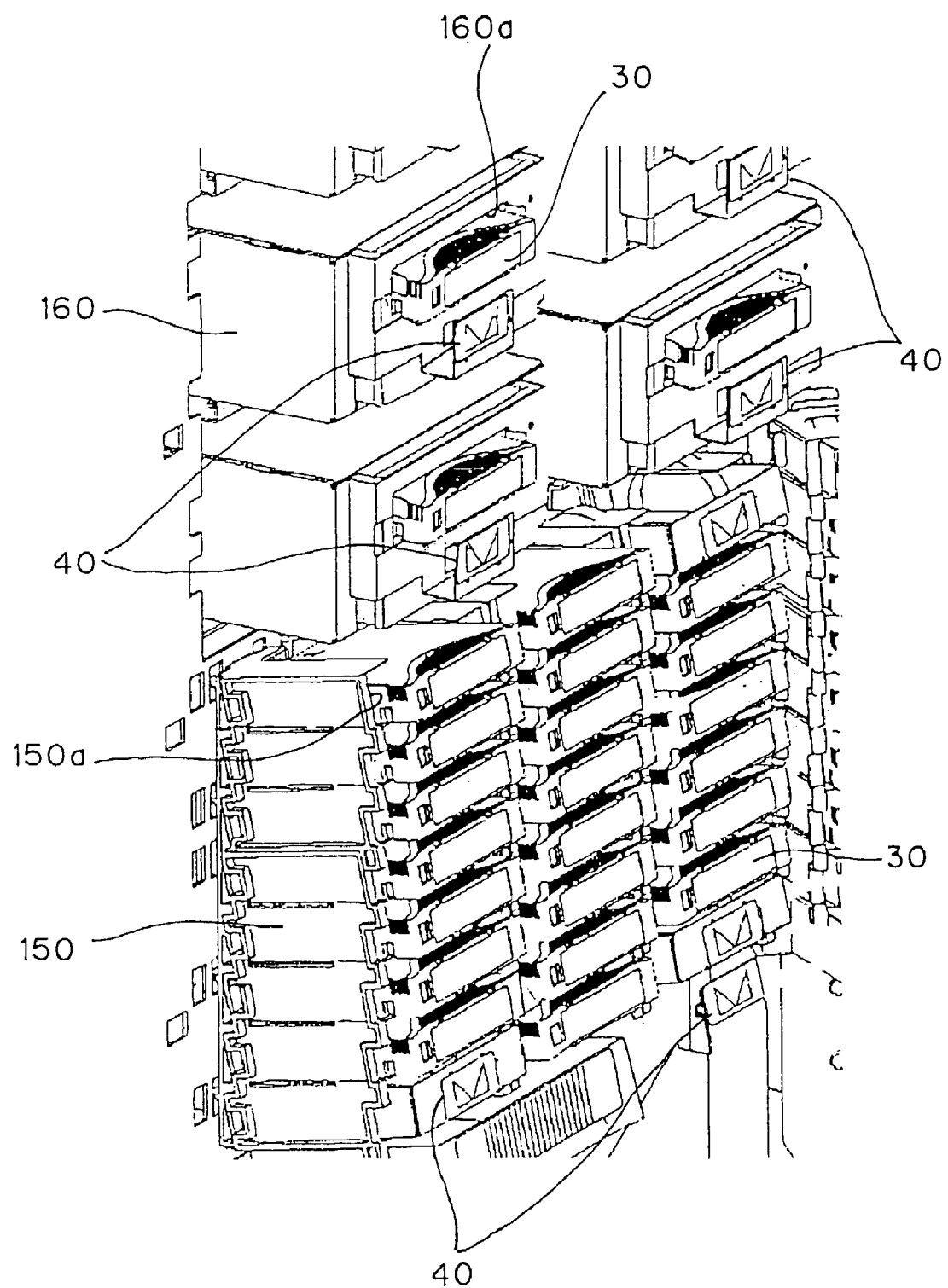
FIG. 5 is an explanatory view useful for understanding the magnetic tape cartridge storage shelves and the recording and reproduction apparatus shown in FIG. 3 and FIG. 4.

FIG. 5 is an explanatory view useful for understanding the magnetic tape cartridge storage shelves and the recording and reproduction apparatus shown in FIG. 3 and FIG. 4.

As shown in FIG. 5, inside the cover member of the library apparatus, there are provided the magnetic tape cartridge storage shelves 150. The magnetic tape cartridge storage shelves 150 are provided with a plurality of magnetic tape cartridge insertion slots 150a into which the magnetic tape cartridges 30 are inserted. Each stage of the magnetic tape cartridge storage shelves 150 is inclined to securely hold the inserted magnetic tape cartridge 30. On a predetermined stage of the magnetic tape cartridge storage shelves 150, there is provided a flag 40 which is used in positioning by a positioning mechanism which will be described later. And there is so arranged that the magnetic tape cartridge 30 is inhibited from being inserted into the stage provided with the flag.

Inside the cover member 110 of the library apparatus 100, there is provided a plurality of recording and reproduction apparatuses 160. On each of the recording and reproduction apparatuses 160, there is provided a magnetic tape cartridge insertion slot 160a into which the magnetic tape cartridge 30 is inserted. Under the magnetic tape cartridge insertion slot 160a of the recording and reproduction apparatus 160 there is provided the same flag 40 as the flag 40 provided on the magnetic tape cartridge storage shelf 150. Incidentally, the positioning mechanism using the flag 40 will be described later.

Figure 6:
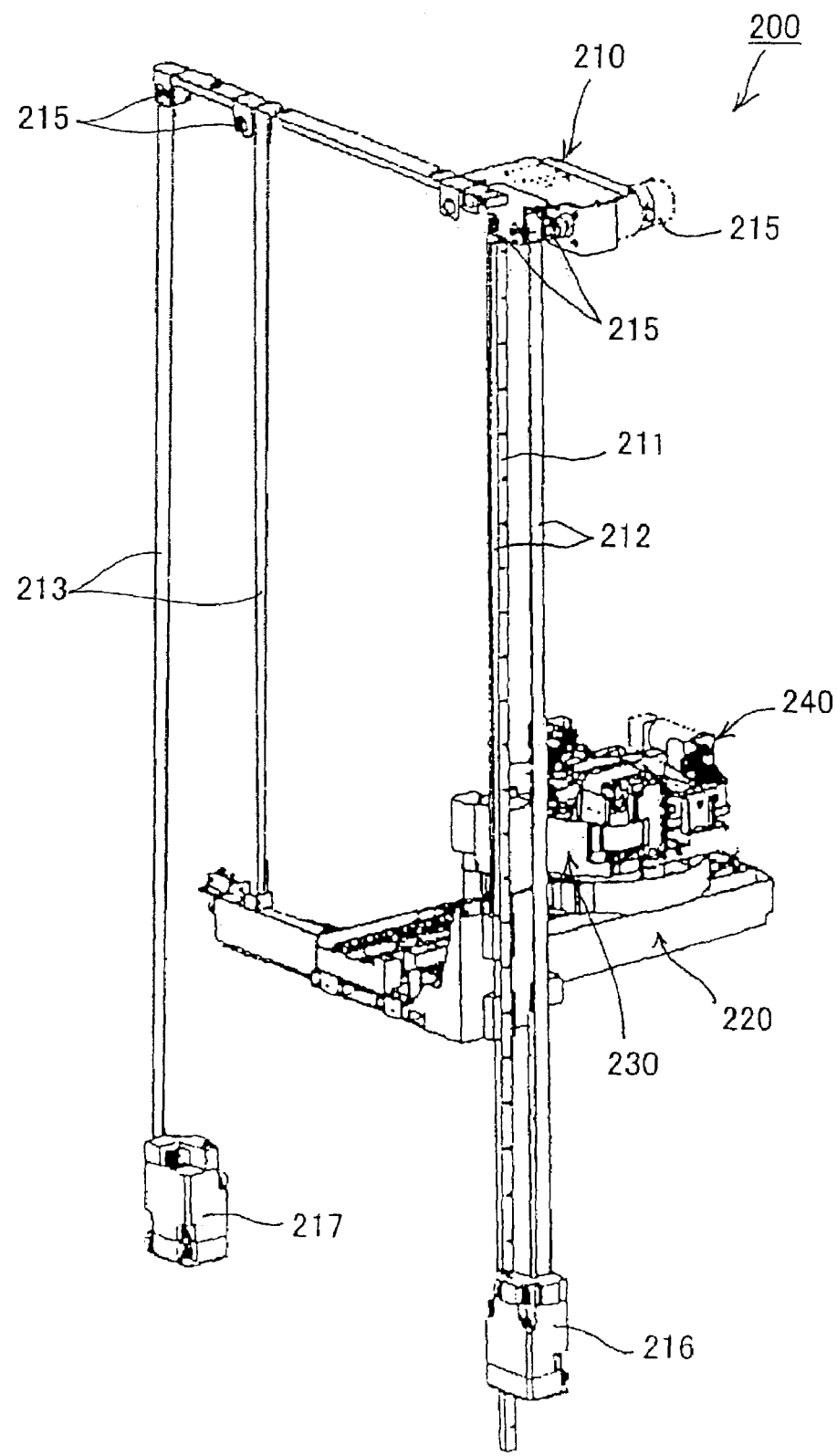
FIG. 6 is an explanatory view useful for understanding the moving mechanism shown in FIG. 3 and FIG. 4.
Figure 7:
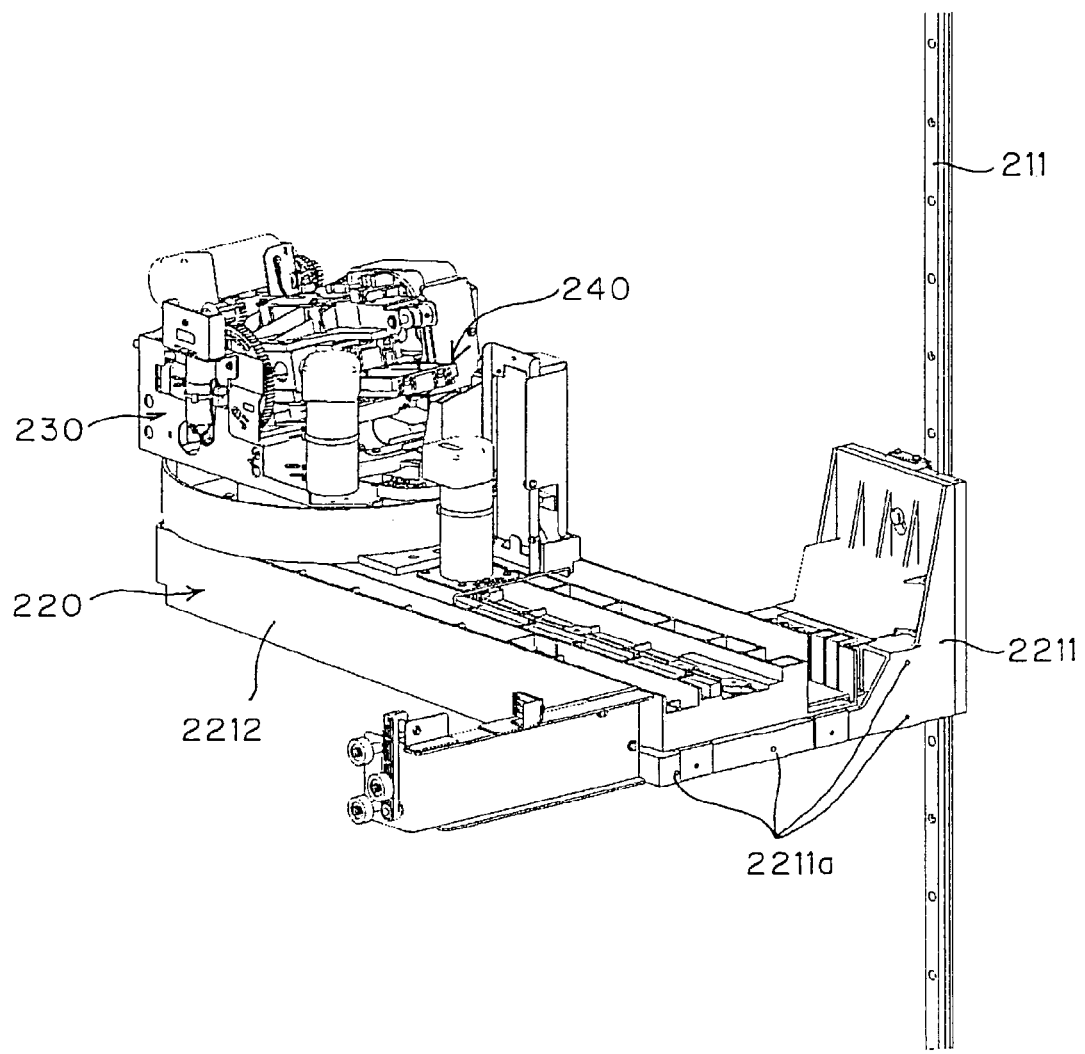
FIG. 7 is an explanatory view useful for understanding the horizontal direction moving mechanism, the horizontal rotary mechanism and the medium holding mechanism shown in FIG. 6.
Figure 8:
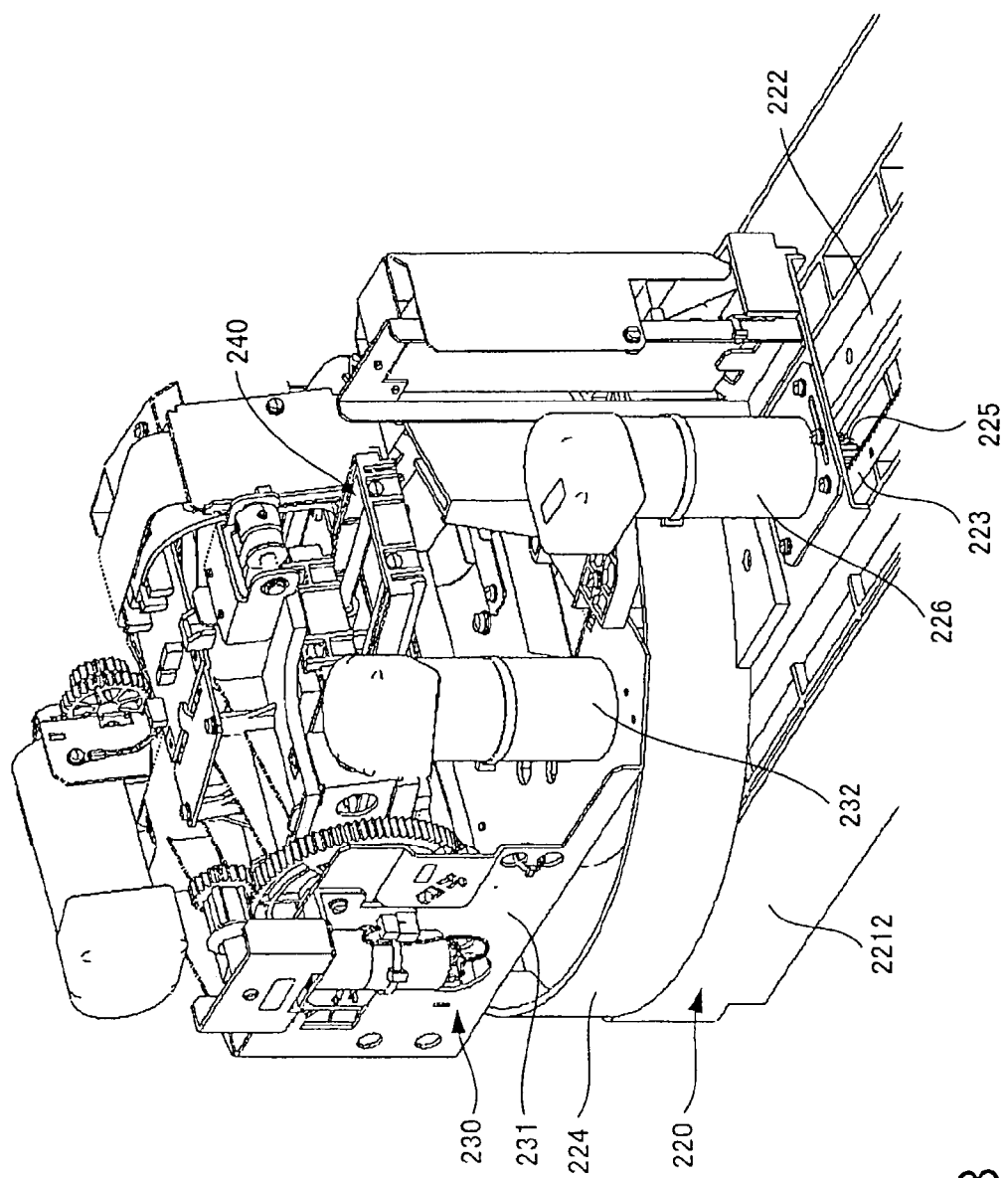
FIG. 8 is an explanatory view useful for understanding the horizontal direction moving mechanism, the horizontal rotary mechanism and the medium holding mechanism shown in FIG. 6.
Figure 9:
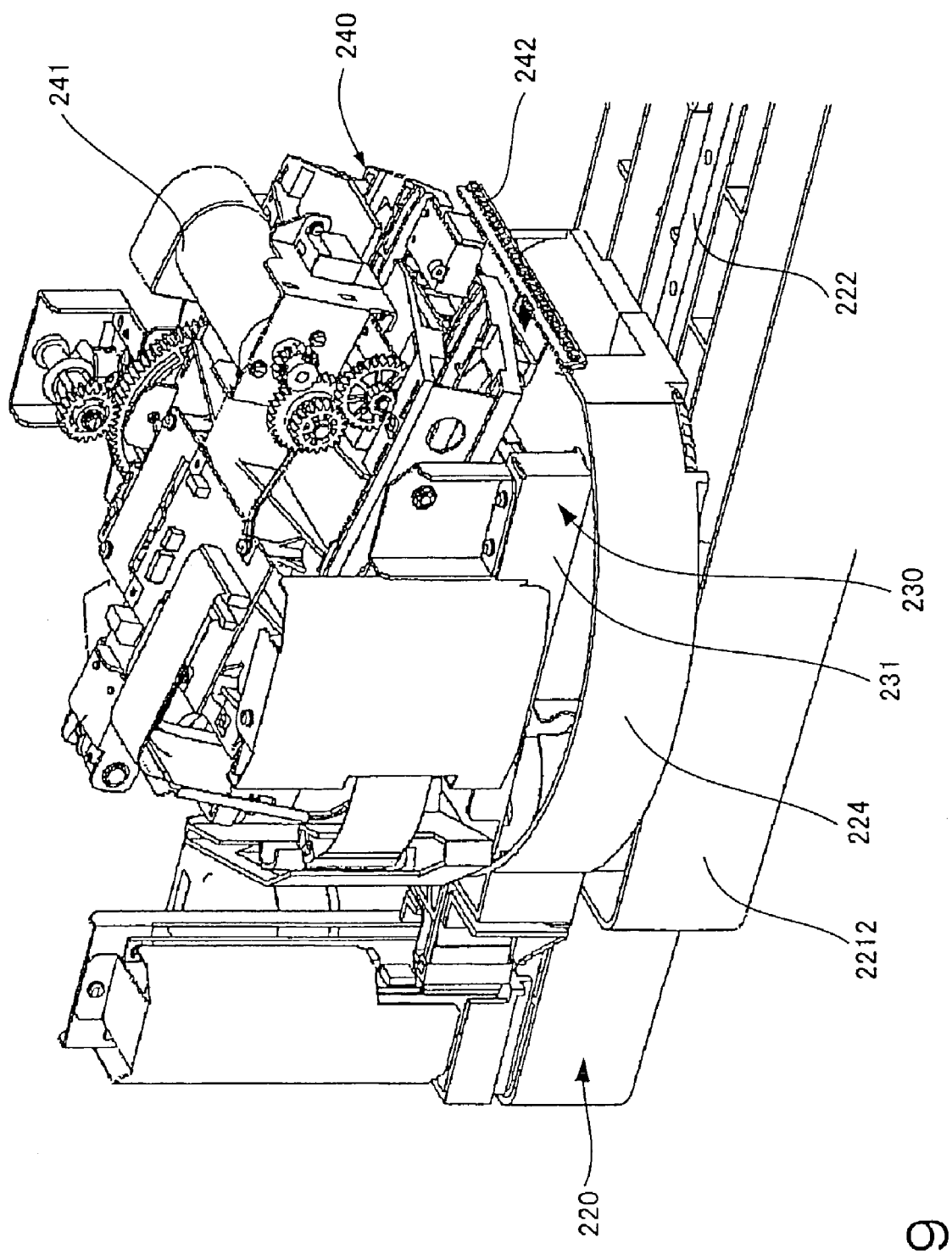
FIG. 9 is an explanatory view useful for understanding the horizontal direction moving mechanism, the horizontal rotary mechanism and the medium holding mechanism shown in FIG. 6.
Figure 10:
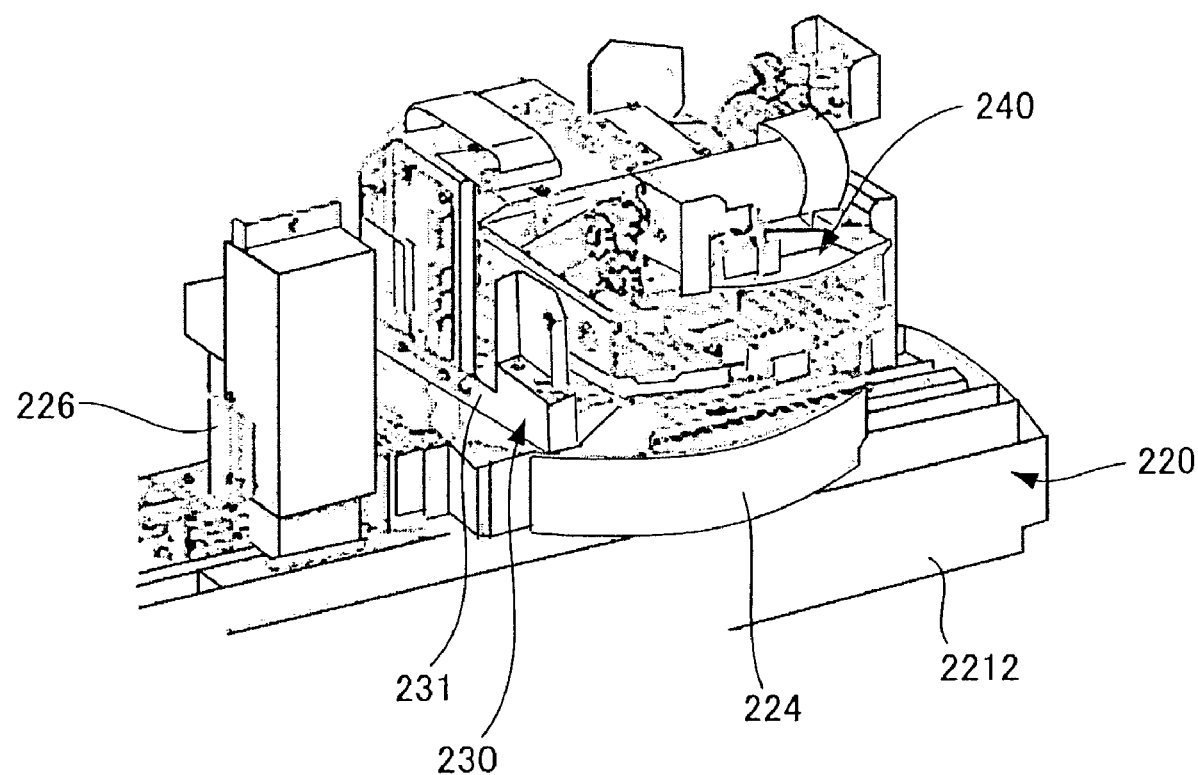
FIG. 10 is an explanatory view useful for understanding the horizontal direction moving mechanism, the horizontal rotary mechanism and the medium holding mechanism shown in FIG. 6.

FIG. 6 is an explanatory view useful for understanding the moving mechanism shown in FIG. 3 and FIG. 4. FIG. 7 to FIG. 10 are each an explanatory view useful for understanding the horizontal direction moving mechanism, the horizontal rotary mechanism and the medium holding mechanism shown in FIG. 6.

A moving mechanism 200 shown in FIG. 6 comprises a vertical direction moving mechanism 210, a horizontal direction moving mechanism 220, a horizontal rotary mechanism 230 and a medium holding mechanism 240.

The vertical direction moving mechanism 210 provided on the moving mechanism 200 shown in FIG. 6 comprises a vertical rail 211 provided on the pole 110d of the cover member shown in FIG. 3 and FIG. 4, a first vertical belt 212, a second vertical belt 213, a vertical belt driving motor 214, a pulley 215, a first weight 216, and a second weight 217.

The horizontal direction moving mechanism 220 shown in FIG. 6 to FIG. 10 comprises: a horizontal direction moving base 2211 travelling along the vertical rail 211 in the vertical direction; a horizontal rail base 2212 fixed on the horizontal direction moving base 2211 travelling along the vertical rail 211 in the vertical direction, together with the horizontal direction moving base 2211; a moving base 224 travelling along a horizontal rail 222 in the horizontal direction; and a moving base driving motor 226 fixed on the moving base 224, on which a driving gear wheel 225 is mounted. On the horizontal rail base 2212, there are provided the horizontal rail 222 and a rack gear 223 on a parallel basis. On the horizontal direction moving base 2211, there is provided a mounting member 2211a onto which an extending member for extending the horizontal rail base 2212 is mounted.

The horizontal rotary mechanism 230 shown in FIG. 6 to FIG. 10 comprises: a horizontal rotary base 231 loaded on the moving base 224; a shaft (not illustrated) fixed on the center of the moving base 224, passing through the horizontal rotary mechanism 230, and on which a pulley (not illustrated) is mounted; a horizontal rotary motor 232 fixed on the horizontal rotary base 231, in which a pulley (not illustrated) is mounted on a rotary shaft of the horizontal rotary motor 232, and a timing belt (not illustrated) provided between a shaft provided on the moving base 224 and the rotary shaft of the horizontal rotary motor 232.

The medium holding mechanism 240 shown in FIG. 6 to FIG. 10 is loaded on the horizontal rotary mechanism 230. The medium holding mechanism 240 comprises a medium holding mechanism use motor 241 and a CCD sensor 242 for reading the above-mentioned flag 40.

Next, there will be explained an operation of the moving mechanism 200 shown in FIG. 6 to FIG. 10.

On one end of the first vertical belt 212 and one end of the second vertical belt 213 shown in FIG. 6, there is mounted the horizontal direction moving base 2211. On another end of the first vertical belt 212, there is mounted the first weight 216, and on another end of the second vertical belt 213, there is mounted the second weight 217. Weight of each of the first weight 216 and the second weight 217 is half of a total weight of the horizontal direction moving mechanism 220 on which the horizontal rotary mechanism 230 and the medium holding mechanism 240 are mounted. Accordingly, since the horizontal direction moving mechanism 220 on which the horizontal rotary mechanism 230 and the medium holding mechanism 240 are mounted and the first weight 216 and the second weight 217 are mounted on the first vertical belt 212 and the second vertical belt 213 disposed via the pulley 215, a balance is maintained at an arbitrary position on the vertical rail 211. The vertical belt driving motor 214 is mounted on the pulley 215 on which the first vertical belt 212 is put. Conduction of the vertical belt driving motor 214 causes the pulley 215 to rotate, so that power is transmitted to the first vertical belt 212 and the second vertical belt 213. As a result, the horizontal direction moving base 2211, which is mounted on the first vertical belt 212 and the second vertical belt 213, travels along the vertical rail 211 in the vertical direction, so that the horizontal direction moving mechanism 220, on which the horizontal rotary mechanism 230 and the medium holding mechanism 240 are loaded, travels along the vertical rail 211 in the vertical direction.

The rack gear 223 always engages the driving gear wheel 225 mounted on the moving base driving motor 226. And thus conduction of the moving base driving motor 226 causes the driving gear wheel 225 to rotate, so that power is transmitted to the rack gear 223. As a result, the moving base 224, on which the horizontal rotary mechanism 230 and the medium holding mechanism 240 are loaded, travels along the horizontal rail 222 in the horizontal direction.

In the horizontal rotary mechanism 230 shown in FIG. 6 to FIG. 10, power by conduction of the horizontal rotary mechanism 230 is transmitted via a timing belt bridging between a pulley mounted on the rotary shaft of the horizontal rotary motor 232 and a shaft provided on the moving base 224 to the shaft, and thus the horizontal rotary mechanism 230 rotates on the shaft.

According to the medium holding mechanism 240 shown in FIG. 6 to FIG. 10, conduction of the medium holding mechanism use motor 241 causes a pair of holding arms (not illustrated) for holding the magnetic tape cartridge 30 to operate so as to hold the magnetic tape cartridge 30.

Next, there will be explained an extended library apparatus in which an extending library apparatus is coupled to the library apparatus explained referring to FIG. 1 to FIG. 10.

In the following figures, the same parts are denoted by the same reference numbers as those of FIG. 1 to FIG. 10, and the redundant explanation will be omitted.

Figure 11:
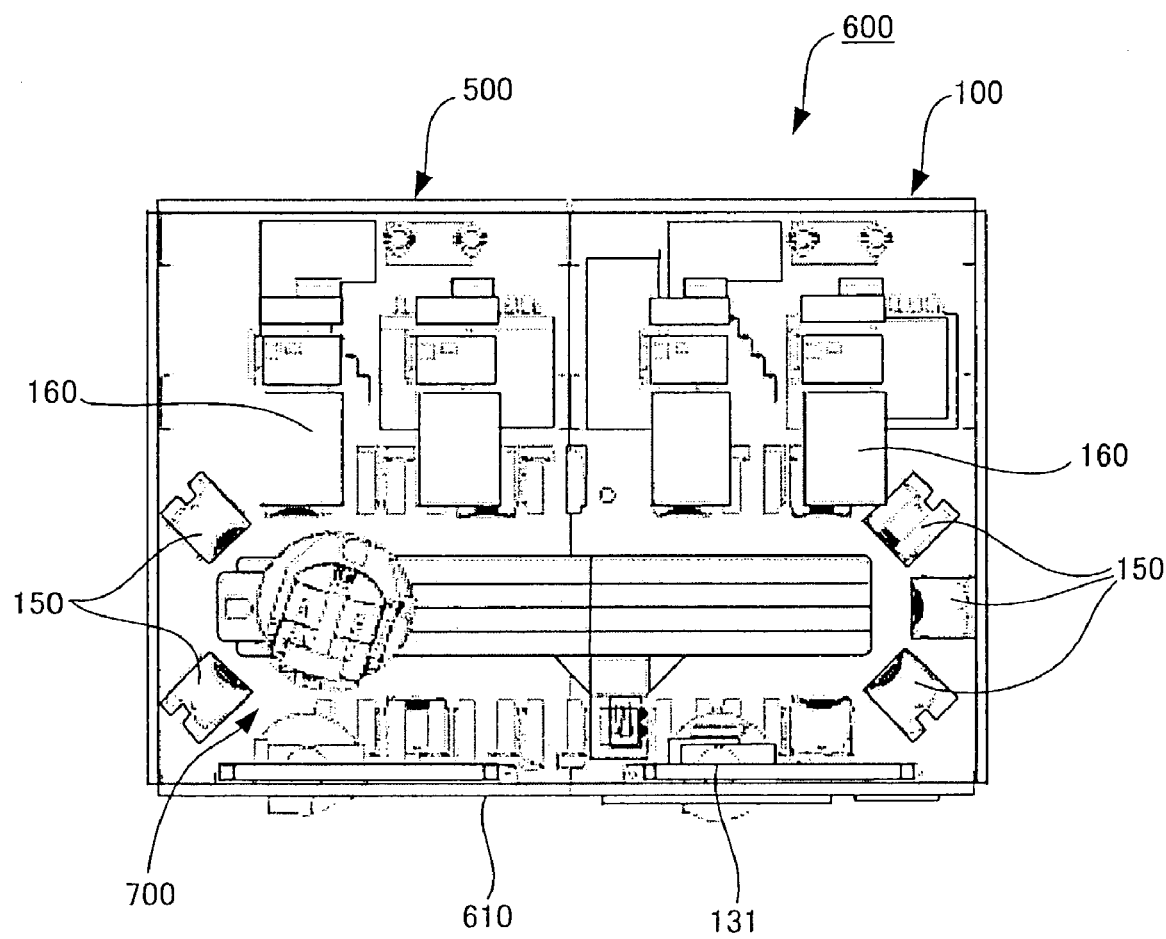
FIG. 11 is an explanatory view useful for understanding an extended library apparatus in which an extending library apparatus is coupled to the library apparatus shown in FIG. 1 to FIG. 10, removing a top plate of the extended library apparatus, looking from the top.

FIG. 11 is an explanatory view useful for understanding an extended library apparatus in which an extending library apparatus is coupled to the library apparatus shown in FIG. 1 to FIG. 10, removing a top plate of the extended library apparatus, looking from the top.

An extended library apparatus 600 shown in FIG. 11 is one in which the library apparatus 100 shown in FIG. 1 to FIG. 10 is coupled to an extending library apparatus 500. The extending library apparatus 500 comprises: an extending cover member 610 for coupling the library apparatus 100 to the extending library apparatus 500; the charging and discharging mechanism 131 for charging and discharging the magnetic tape cartridge 30 through the charging and discharging slot 130 shown in FIG. 1; magnetic tape cartridge storage shelves 150 for storing a plurality of magnetic tape cartridges 30; recording and reproduction apparatuses 160 for performing recording of information onto the magnetic tape cartridges 30 and reproduction of information recorded on the magnetic tape cartridges 30, and a moving mechanism 700 for moving the magnetic tape cartridges 30 between the charging and discharging mechanism 131 and the magnetic tape cartridge storage shelves 150 and the recording and reproduction apparatuses 160.

Figure 12:
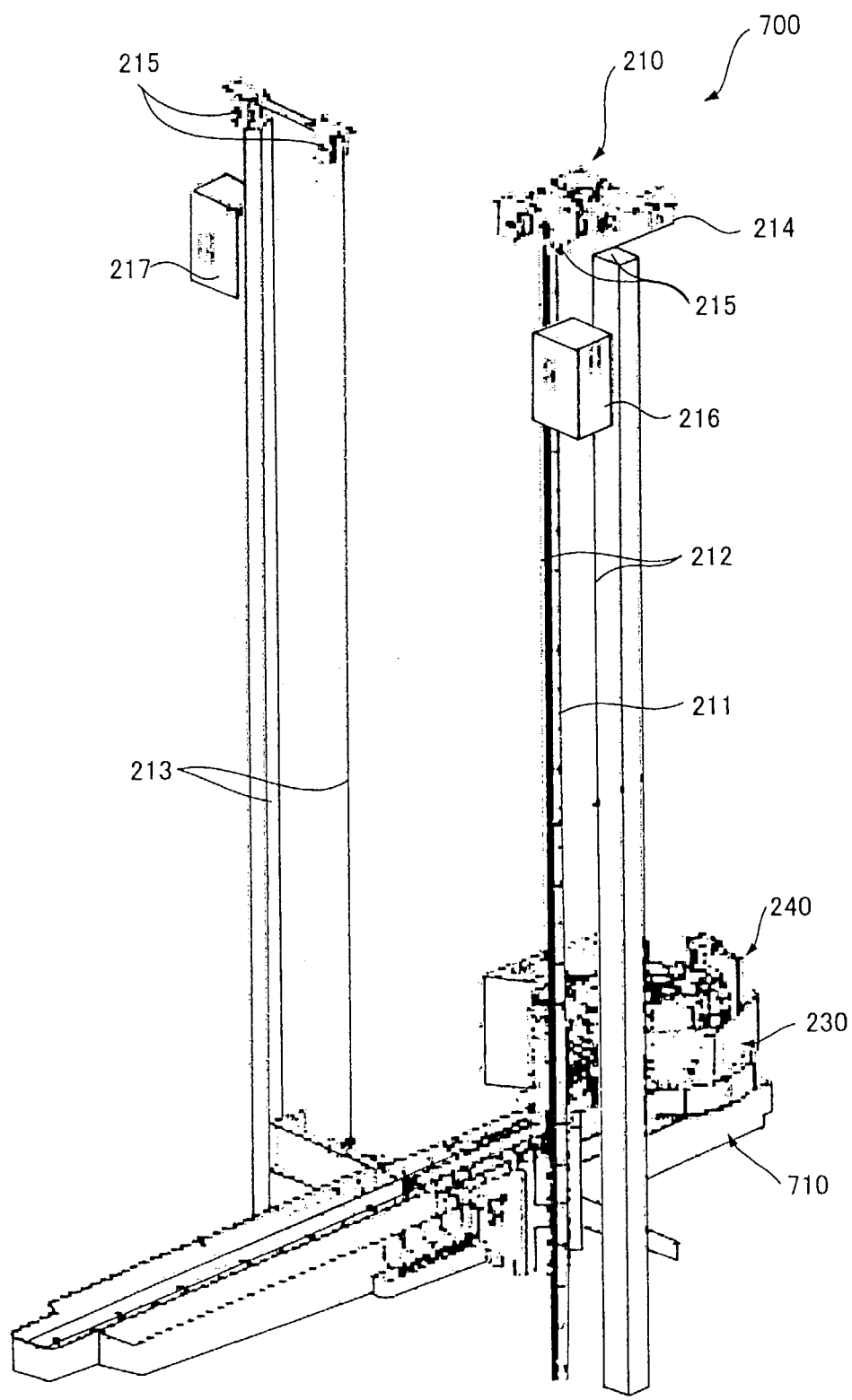
FIG. 12 is an explanatory view useful for understanding the moving mechanism shown in FIG. 11.
Figure 13:
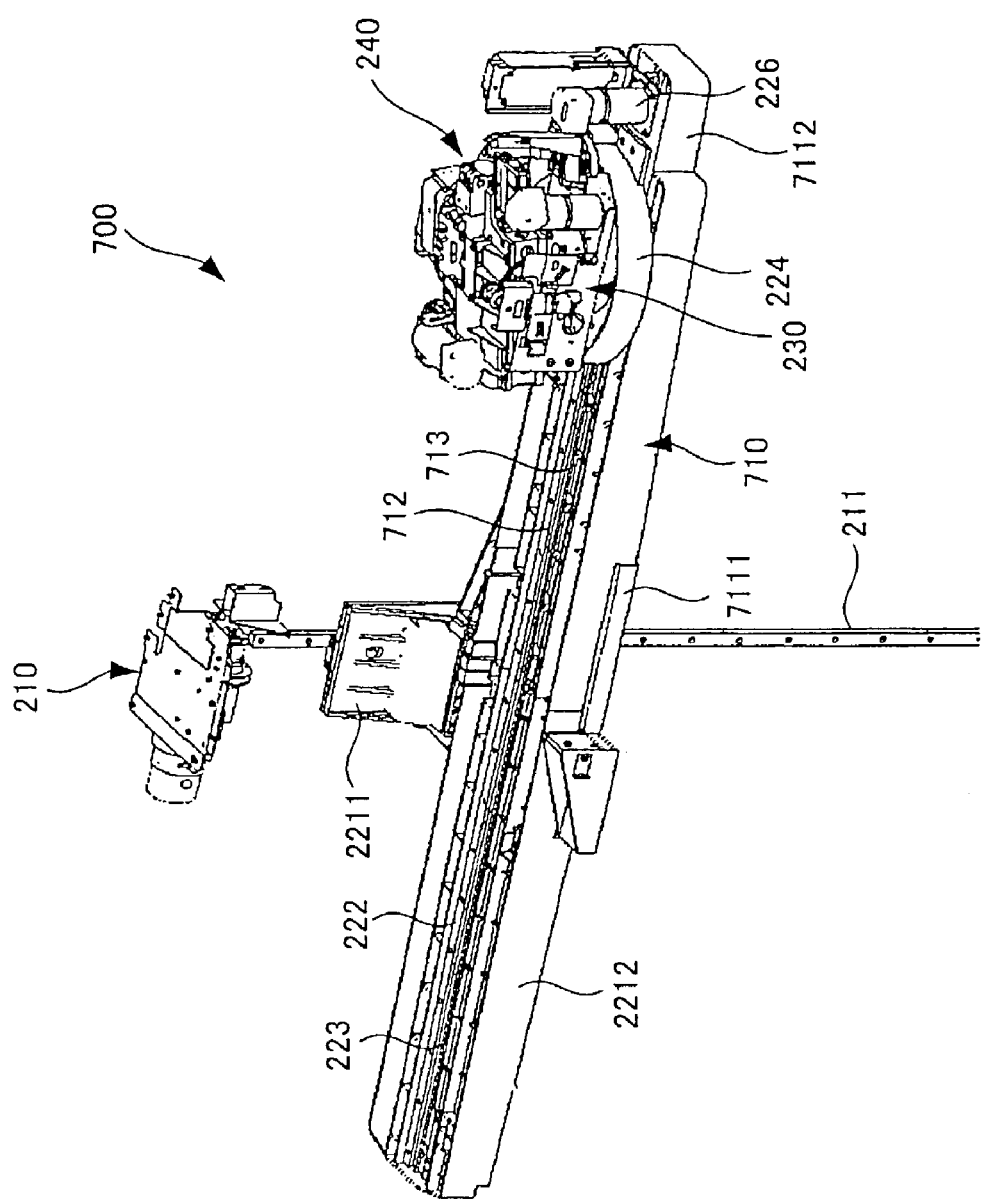
FIG. 13 is an explanatory view useful for understanding the moving mechanism shown in FIG. 11.
Figure 14:
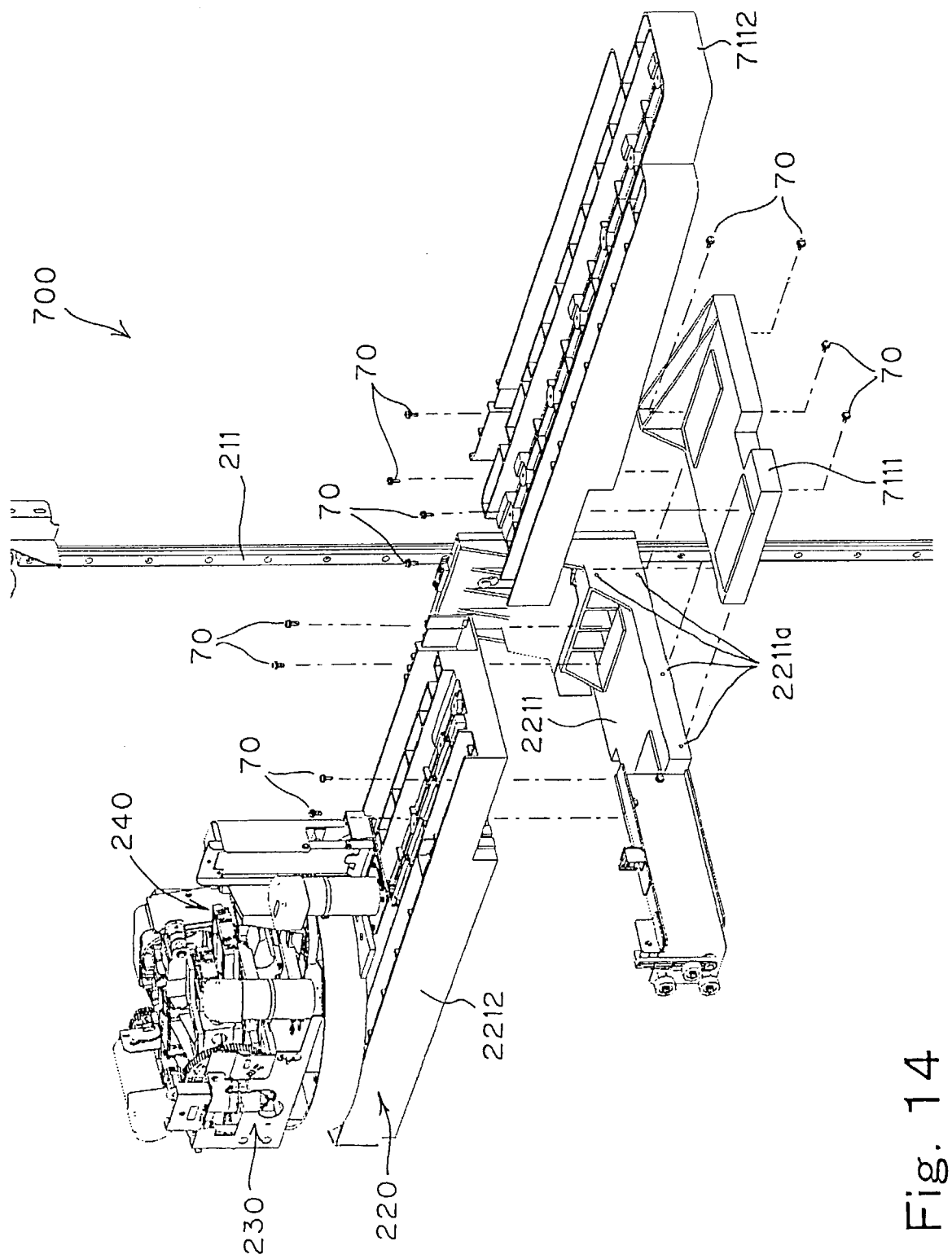
FIG. 14 is a perspective view of the horizontal direction moving base and the horizontal rail base shown in FIG. 12 to FIG. 13.

FIG. 12 and FIG. 13 are each an explanatory view useful for understanding the moving mechanism shown in FIG. 11. FIG. 14 is a perspective view of the horizontal direction moving base and the horizontal rail base shown in FIG. 12 to FIG. 13.

The moving mechanism 700 shown in FIG. 12 comprises the vertical direction moving mechanism 210, a horizontal direction moving mechanism 710, the horizontal rotary mechanism 230 and the medium holding mechanism 240. The horizontal direction moving mechanism 710 shown in FIG. 12 comprises: the horizontal direction moving base 2211 travelling along the vertical rail 211 in the vertical direction; a horizontal rail base 2212 fixed on the horizontal direction moving base 2211 travelling along the vertical rail 211 in the vertical direction, together with the horizontal direction moving base 2211; a horizontal direction moving base 7111 coupled to the horizontal direction moving base 2211 travelling along the vertical rail 211 in the vertical direction, together with the horizontal direction moving base 2211; a horizontal rail base 7112 fixed on the horizontal direction moving base 7111 and coupled to the horizontal direction moving base 2211 travelling along the vertical rail 211 in the vertical direction, together with the horizontal direction moving bases 2211 and 7111; the moving base 224 travelling along the horizontal rail 222 in the horizontal direction; and the moving base driving motor 226 fixed on the moving base 224, on which the driving gear wheel 225 is mounted. On the horizontal rail base 2212, there are provided the horizontal rail 222 and a rack gear 223 on a parallel basis. On the horizontal rail base 7112, there are provided a horizontal rail 712 coupled to the horizontal rail 222, and a rack gear 713 coupled to the rack gear 223 on a parallel basis.

On the horizontal direction moving base 2211, there is provided the mounting member 2211a onto which the horizontal rail base 7112, as an example of the extending member for extending the horizontal rail base 2212, is mounted. The horizontal rail base 7112 is fixed with a bolt as shown in FIG. 14.

Figure 15:
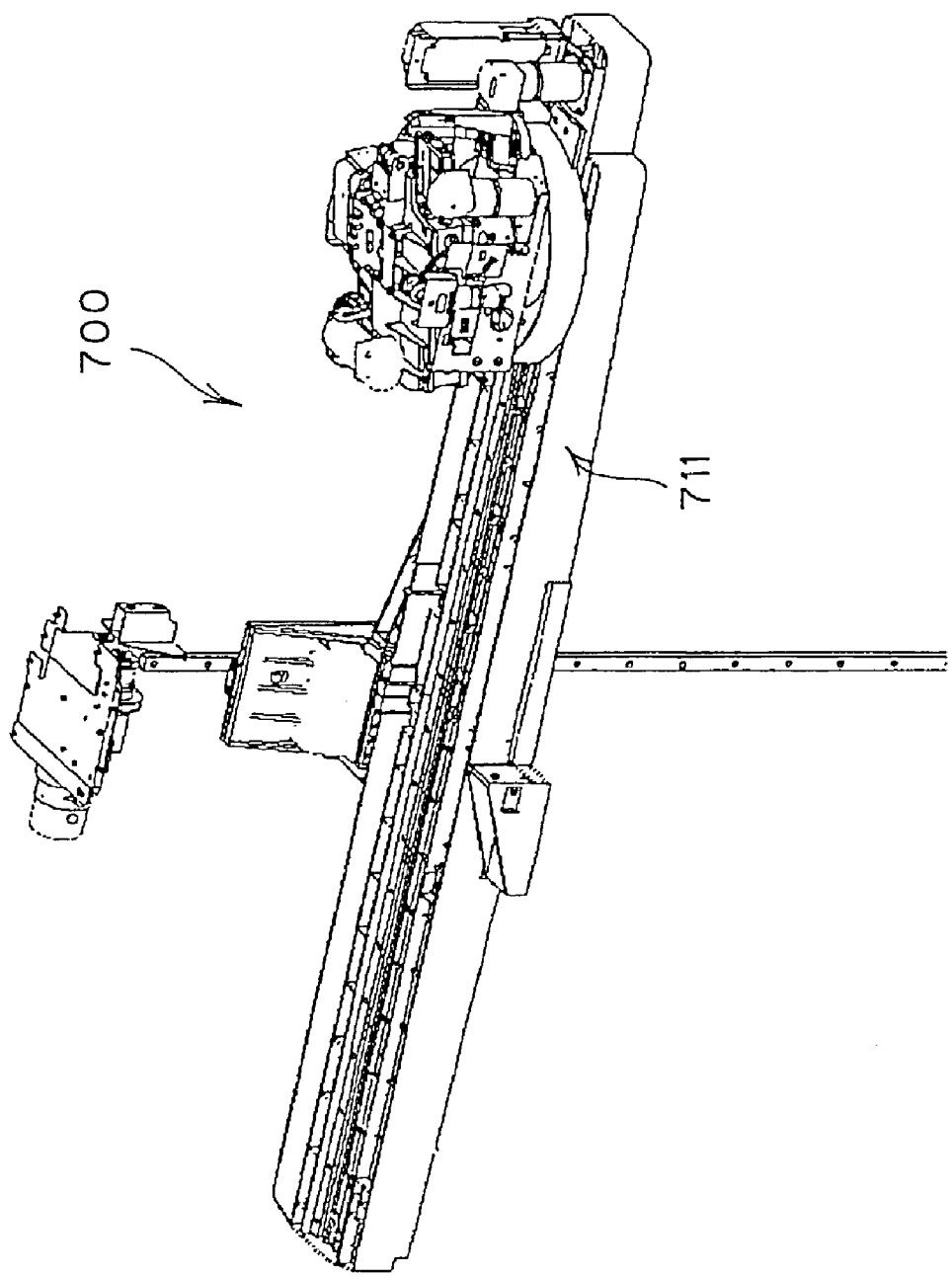
FIG. 15 is an explanatory view useful for understanding another example of the horizontal direction moving mechanism shown in FIG. 12 to FIG. 14.

FIG. 15 is an explanatory view useful for understanding another example of the horizontal direction moving mechanism shown in FIG. 12 to FIG. 14.

A horizontal direction moving mechanism 710' shown in FIG. 15 is constructed in such a manner that a horizontal rail base 711 in united body is fixed on the horizontal direction moving bases 2211 and 7111 and travels along the vertical rail 211 in the vertical direction, together with the horizontal direction moving bases 2211 and 7111.

In the manner as described above, it is acceptable that the horizontal rail base of the horizontal direction moving mechanism is formed in united body, but not restricted to one in which a plurality of horizontal rail bases, which is associated with a plurality of cover members as shown in FIG. 11 to FIG. 13, are coupled with one another. Since the horizontal rail formed in united body has no joint, the moving base loaded with the horizontal rotary mechanism and the medium holding mechanism can travel more smoothly on the horizontal rail in the horizontal direction as compared with travelling on the jointed horizontal rail in the horizontal direction.

Next, there will be explained a positioning mechanism in the extended library apparatus 600 shown in FIG. 11, wherein a position of the medium holding mechanism to the magnetic tape cartridge storage shelves and the recording and reproduction apparatus is measured to control the position of the medium holding mechanism.

Figure 16:
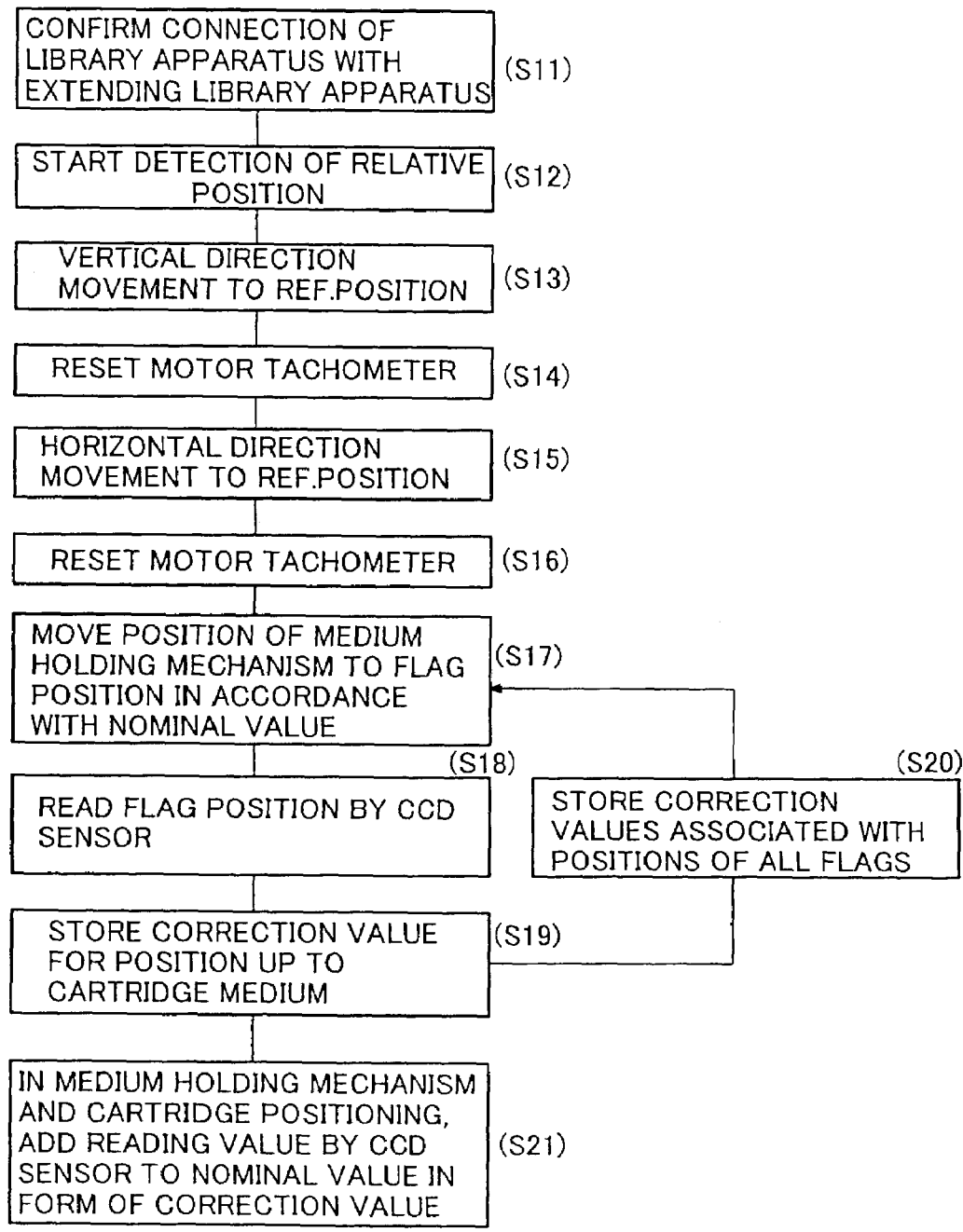
FIG. 16 is a flowchart useful for understanding a control of a position of the medium holding mechanism by the positioning mechanism.
Figure 17:
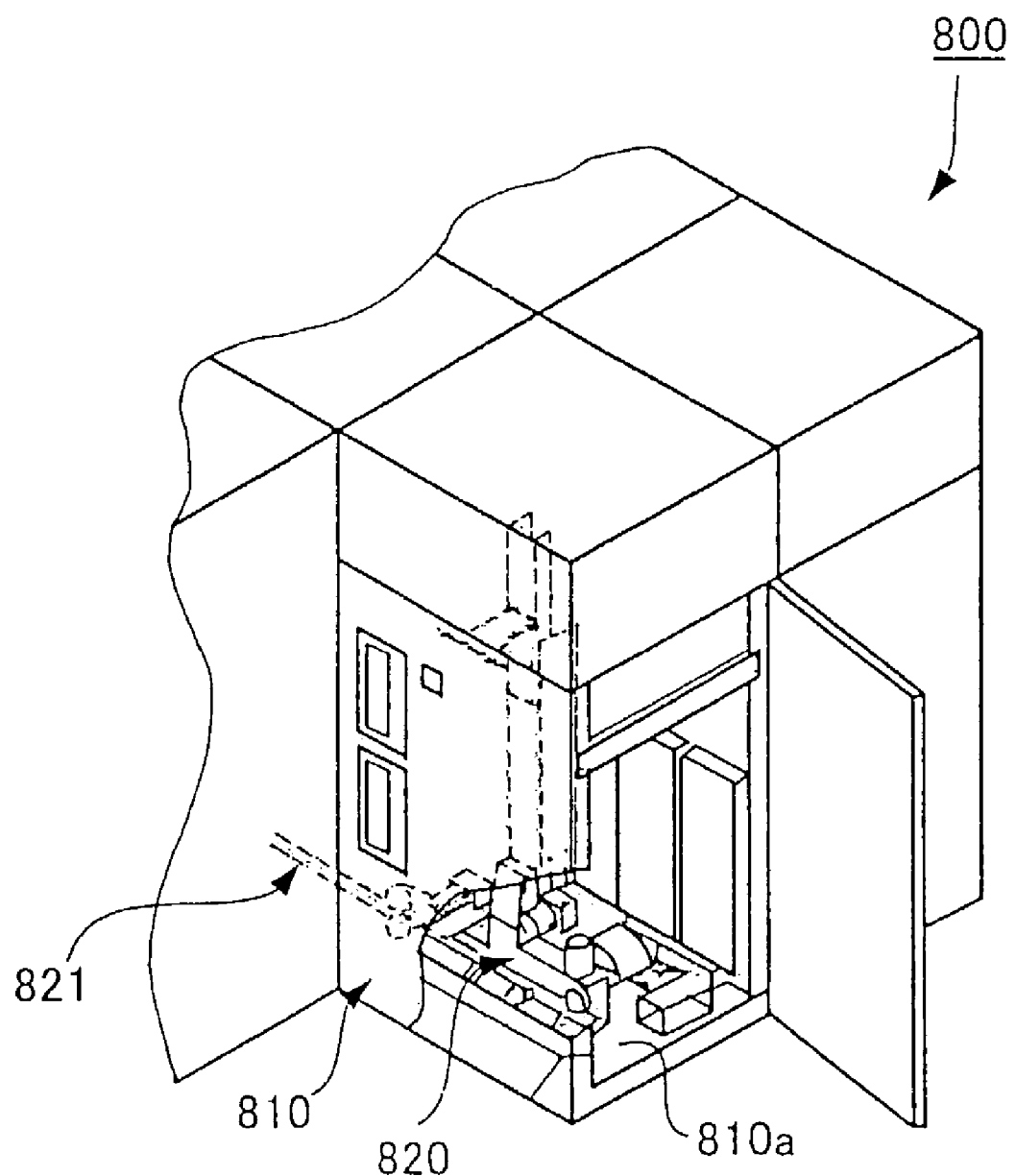
FIG. 17 is a perspective view of the conventional library apparatus, looking from the front.
Figure 18:
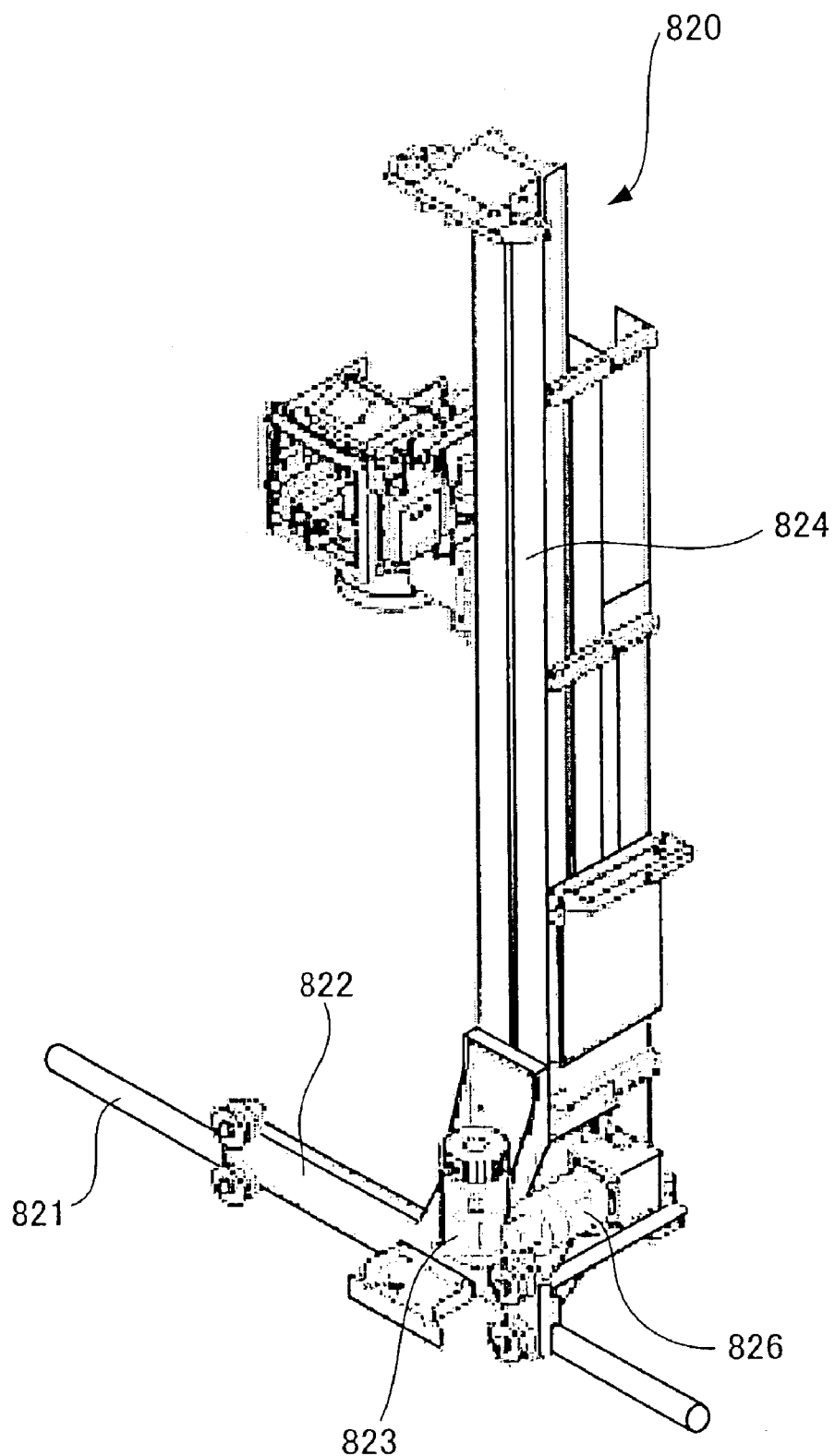
FIG. 18 is a perspective view of the moving mechanism shown in FIG. 17.
Figure 19:
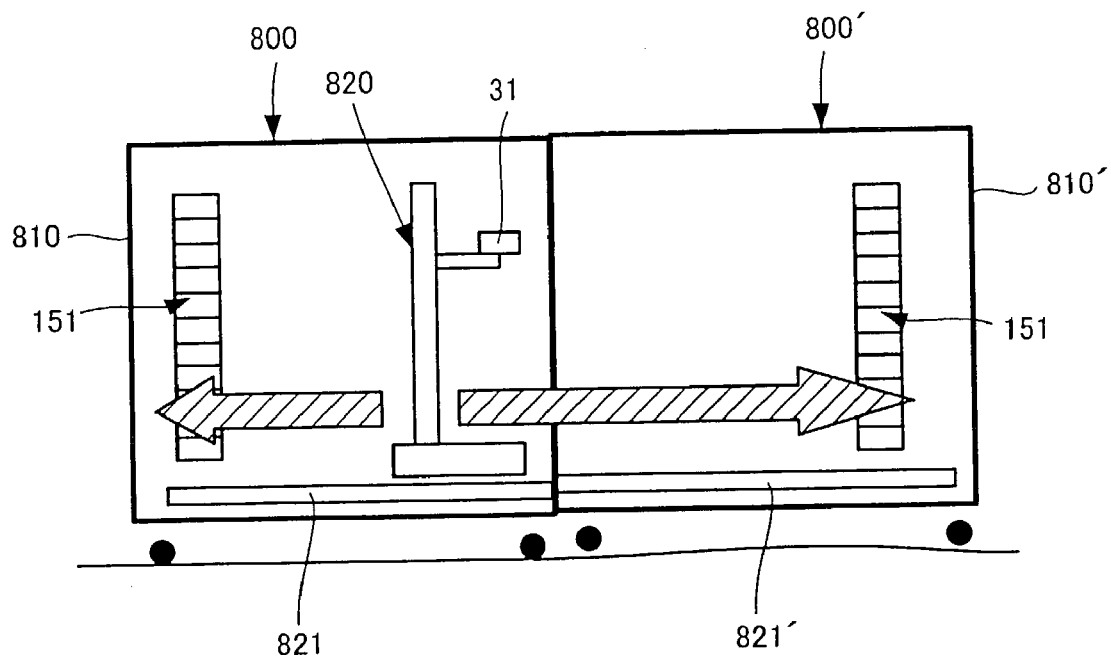
FIG. 19 is an explanatory view useful for understanding a first type of extended library apparatus of the conventional extended library apparatuses.
Figure 20:
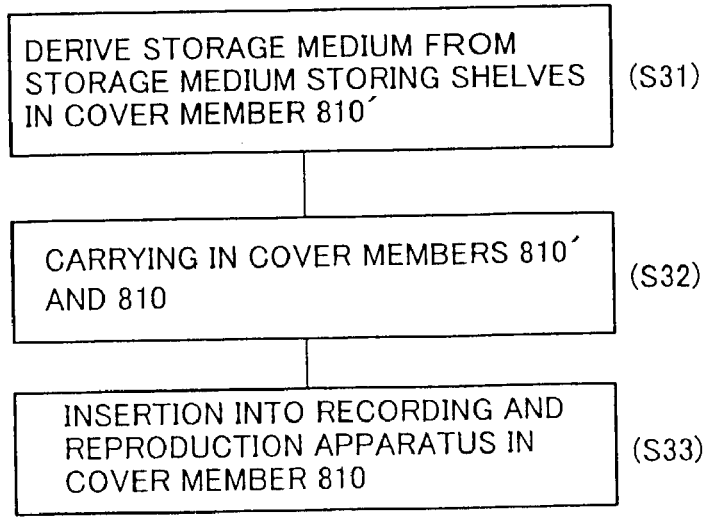
FIG. 20 is a flowchart useful for understanding a flow in which storage media are carried in the first type of extended library apparatus shown in FIG. 19.

FIG. 16 is a flowchart useful for understanding a control of a position of the medium holding mechanism by the positioning mechanism.

First, it is confirmed that the library apparatus 100 constituting the extended library apparatus 600 is surely jointed to the extending library apparatus 500 (step S11).

Next, start detection of the relative position of the magnetic tape cartridge storage shelves 150 and the recording and reproduction apparatus 160 to the medium holding mechanism 240 (step S12).

Next, the horizontal direction moving mechanism 710, on which the horizontal rotary mechanism 230 and the medium holding mechanism 240 are mounted, is traveled along the vertical rail 211 to a reference position (here the top of the vertical rail 211) for a detection (step S13).

Next, a motor tachometer of the vertical belt driving motor 214 is reset (step S14).

Next, the moving base 224, on which the horizontal rotary mechanism 230 and the medium holding mechanism 240 are mounted, is traveled along the horizontal rails 222 and 712 to a reference position (here the top of the horizontal rail 222 not jointed to the horizontal rail 712) for a detection (step S15).

Next, a motor tachometer of the moving base driving motor 226 is reset (step S16).

Next, a position of the medium holding mechanism 240 is traveled in accordance with a predetermined nominal value (step S17).

Next, the CCD sensor 242 provided on the medium holding mechanism 240 is used to read the flag 40 provided at the position wherein the medium holding mechanism 240 moved in the step S17 (step S18).

Next, a correction value for the position wherein the medium holding mechanism 240 moved in the step S17 and the position of the flag read by the CCD sensor 242 in the step S18 is computed by a count of the motor tachometer of the vertical belt driving motor 214 and a count of the motor tachometer of the moving base driving motor 226, and the correction value is stored (step S19).

Next, correction values associated with positions of all the flags 40 disposed on the extended library apparatus 600 are stored by means of repeating the steps S17 to S19 (step S20).

Lastly, when the correction values associated with positions of all the flags 40 disposed on the extended library apparatus 600 are stored in the step S20, the stored correction values are added to the predetermined nominal value, so that an exact relative position between the magnetic tape cartridge storage shelves 150 and the recording and reproduction apparatuses 160, and the medium holding mechanism 240 is stored (step S21).

According to the library apparatus provided with such a positioning mechanism, even if a plurality of cover members is set up in a state that there occur differences in level between the cover members owing to conditions of a set up surface for a plurality of library apparatuses, execution of positioning by the positioning mechanism after all the cover members are set up makes it possible to adjust the relative position between the magnetic tape cartridge storage shelves and the recording and reproduction apparatuses, and the medium holding mechanism with great accuracy.

Figure 21:
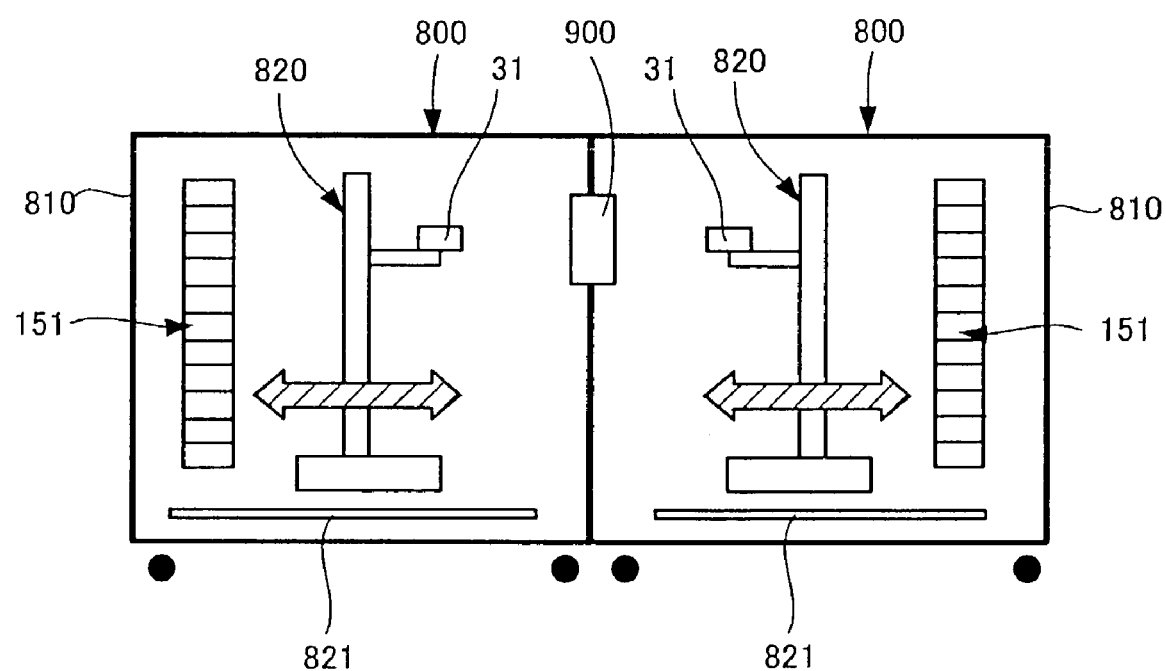
FIG. 21 is an explanatory view useful for understanding a second type of extended library apparatus of the conventional extended library apparatuses.
Figure 22:
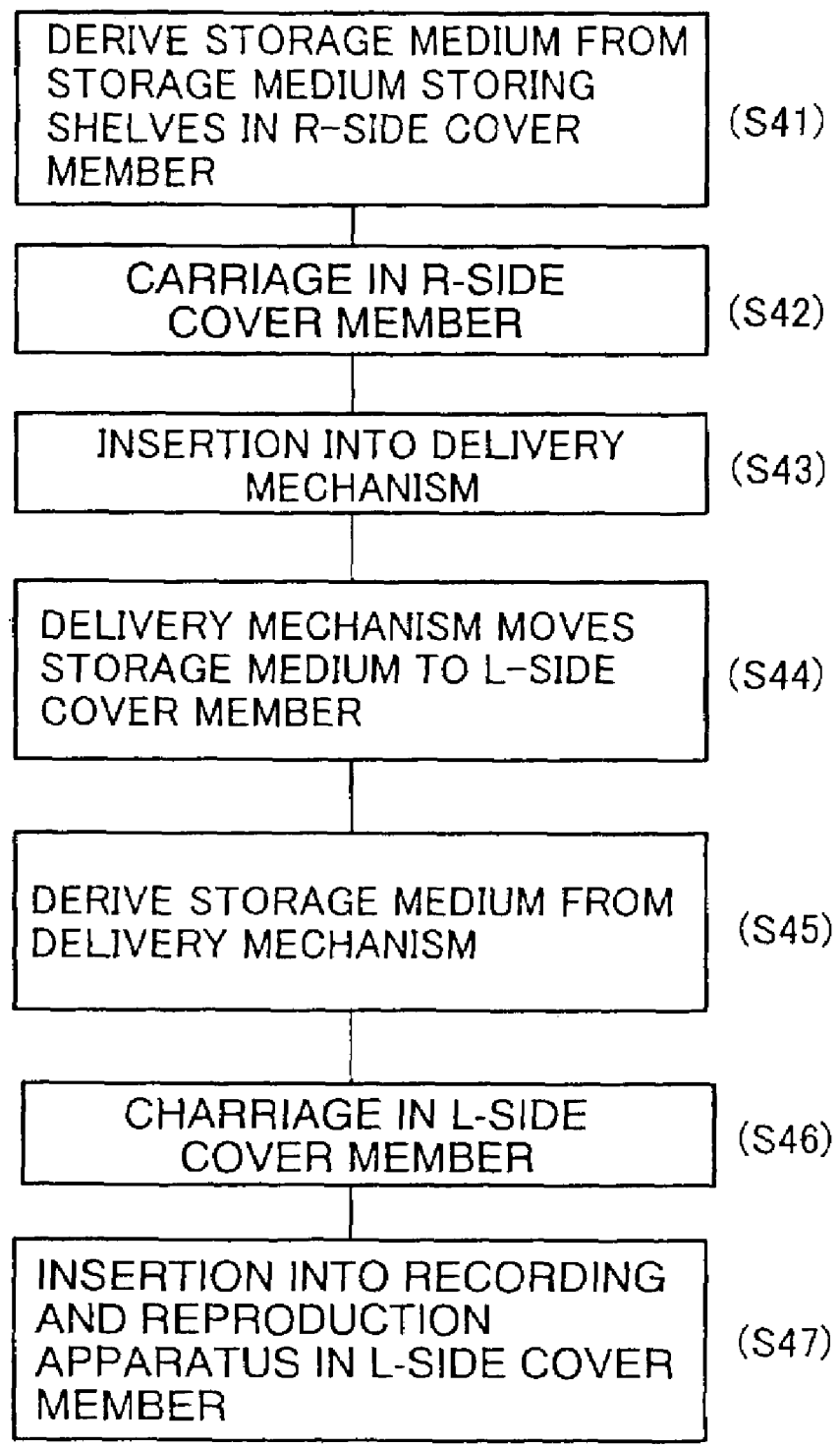
FIG. 22 is a flowchart useful for understanding a flow in which storage media are carried in the second type of extended library apparatus shown in FIG. 21.

As mentioned above, according to the library apparatus of the present embodiment, the horizontal rail is not fixed on the cover member. Thus, when the cover members of a plurality of library apparatuses are coupled to one another, even if those cover members are set up in a state that there occur differences in level on the cover members owing to conditions of a set up surface for a plurality of library apparatuses, it has no effect of differences in level between the cover members on connection between the horizontal rails. Accordingly, it is possible to readily couple a plurality of library apparatuses with one another. Further, according to the library apparatus of the present embodiment, in connection of a plurality of horizontal rails when the cover members of a plurality of library apparatuses are coupled with one another, coupling of the same surfaces of the respective horizontal rails to the reference makes it possible to couple the horizontal rails with one another free from differences in level. Furthermore, according to the library apparatus of the present embodiment, in connection of a plurality of horizontal rails when the cover members of a plurality of library apparatuses are coupled with one another, there is no need of the storage medium delivery mechanism provided on the second type of extended library apparatus explained referring to FIG. 21 and FIG. 22, and thus it is possible to couple the horizontal rails with one another making no sacrifice of moving time of the storage medium. Still furthermore, according to the library of the present embodiment, the vertical rail is fixed at the position being one-sided in the cover member, and thus it is possible to dispose more magnetic tape cartridge storage shelves in a space wherein the vertical rail is not fixed, inside the cover member.

Incidentally, according to the present embodiment, there is explained an example in which the present invention is applied to a magnetic tape library apparatus wherein a desired magnetic tape is mounted on a tape drive so that information is recorded onto the magnetic tape, or information recorded on the magnetic tape is reproduced. However, the present invention is not restricted to such an embodiment, and the present invention is applicable to for example, a magneto-optical disk library apparatus wherein a desired magneto-optical disk is mounted on a magneto-optical disk drive so that information is recorded onto the magneto-optical disk, or information recorded on the magneto-optical disk is reproduced.

As selling forms of a library apparatus, there are considered three forms as set forth below.

A first selling form relates to a library apparatus in which a vertical rail for moving a recording medium input-output machine disposed inside the library apparatus in a vertical direction is fixed on a cover member, a horizontal rail for moving the recording medium input-output machine in a horizontal direction is moved along the vertical rail in the vertical direction, so that a recording medium travels between the storage medium storage shelves and the drive, and the horizontal rail being provided with a mounting section.

A second selling form relates an extended library apparatus having such an arrangement in which a vertical rail for moving in the vertical direction a storage medium input-output machine disposed inside the extended library apparatus wherein a plurality of cover members is coupled with one another taking as a standard a library apparatus having the same structure as the library apparatus of the first selling form, is fixed onto one of a plurality of cover members, and a horizontal rail for moving the storage medium input-output machine in the horizontal direction is traveled along the vertical rail in the vertical direction, so that a recording medium travels between the storage medium storage shelves and the drive.

A third selling form relates a library apparatus to be coupled to the library apparatus having the same structure as the first selling form of library apparatus, used in the first selling form of extended library apparatus.

As mentioned above, according to the present invention, it is possible to provide a library apparatus having a mechanism capable of coupling a plurality of library apparatuses making no sacrifice of moving time of the storage medium.

Although the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A library apparatus comprising: storage medium storing shelves for storing a plurality of storage media; a drive performing at least information reproduction for storage media; a moving mechanism moving storage media between the storage medium storing shelves and the drive; and a cover member inside which the storage medium storing shelves, the drive and the moving mechanism are disposed,
wherein said moving mechanism comprises:
a vertical rail fixed on said cover member in a vertical direction, such that said vertical rail remains stationary with respect to said cover member;
a horizontal rail extending in a horizontal direction with respect to said vertical rail, said horizontal rail moving along said vertical rail in a vertical direction;
a storage medium input-output machine moving along said horizontal rail in the horizontal direction to perform an operation for input-output of storage media to the storage medium storing shelves and the drive; and
a mounting section for mounting an extending member for extending said horizontal rail, wherein said extending member extends in the horizontal direction and is used for increasing the horizontal length of the horizontal rail to extend into a second library apparatus.

2. A library apparatus comprising: storage medium storing shelves storing a plurality of storage media; a drive performing at least information reproduction for storage media; a moving mechanism moving storage media between the storage medium storing shelves and the drive; and an extended cover member inside which the storage medium storing shelves, the drive and the moving mechanism are disposed, wherein the extended cover member consists of a plurality of horizontally adjacent cover member assemblies that are coupled with one another,
wherein said moving mechanism comprises:
a vertical rail fixed on one of the plurality of cover members in a vertical direction, such that said vertical rail remains stationary with respect to said cover member associated therewith;
a horizontal rail extending along the plurality of cover members in a horizontal direction with respect to said vertical rail, said horizontal rail moving along said vertical rail in a vertical direction; and
a storage medium input-output machine moving along said horizontal rail in the horizontal direction to perform an operation for input-output of the storage media to the storage medium storing shelves and the drive.

3. A library apparatus according to claim 2, wherein said horizontal rail is one in which a plurality of horizontal rail member segments are coupled together, and each of said horizontal rail member segments is associated with one of the plurality of cover members.

4. A library apparatus according to claim 2, wherein said horizontal rail consists of a united body.

5. A library apparatus according to claim 2, further comprising a positioning mechanism measuring a position of said storage medium input-output machine to the storage medium storing shelves and the drive to adjust the position of said storage medium input-output machine.

6. A library apparatus according to claim 1, wherein said vertical rail is fixed at a position along one side of the associated cover member.

7. A library apparatus according to claim 2, wherein said vertical rail is fixed at a position along one side of the associated cover member.

8. An extended library apparatus comprising:
a library apparatus including a first set of storage medium storing shelves for storing a plurality of storage media, a first drive performing at least information reproduction for storage media, a moving mechanism moving storage media between the storage medium storing shelves and the drive; and a first cover member inside which the first set of storage medium storing shelves, the first drive and the moving mechanism are disposed;
an extending library apparatus coupled to said library apparatus including a second set of storage medium storing shelves for storing a plurality of storage media, a second drive performing at least information reproduction for storage media, and a second cover member inside which the second set of storage medium storing shelves and the second drive are disposed;
wherein said moving mechanism comprises:
a vertical rail fixed on said first cover member in a vertical direction, such that said vertical rail remains stationary with respect to said first cover member;

a horizontal rail extending within both said library apparatus and said extending library apparatus in a horizontal direction with respect to said vertical rail, said horizontal rail moving along said vertical rail in a vertical direction; and a storage medium input-output machine moving along said horizontal rail in the horizontal direction to perform an operation for input-output of storage media to the first and second sets of storage medium storing shelves and the first and second drive.

9. The extending library apparatus according to claim 8, wherein said horizontal rail includes a plurality of horizontal rail segments that are coupled together.

10. The extending library apparatus according to claim 8 wherein said horizontal rail consists of a single unitary body.

* * * * *